United States Patent
Chen et al.

(10) Patent No.: US 11,303,743 B2
(45) Date of Patent: Apr. 12, 2022

(54) MOUNT FOR INTERCHANGEABLY RECEIVING VARIOUS EXPANDABLE ACCESSORIES ATTACHED TO A PORTABLE ELECTRONIC DEVICE

(71) Applicant: PopSockets LLC, Boulder, CO (US)

(72) Inventors: Ivan Chen, Boulder, CO (US); James Ridzon, Boulder, CO (US); Nicholas Von Bargen, Boulder, CO (US); Lawrence Herman Fong, Boulder, CO (US); Michael Kory, Boulder, CO (US); Randy Yang Chiang, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 0 days.

(21) Appl. No.: 16/814,265

(22) Filed: Mar. 10, 2020

(65) Prior Publication Data
US 2021/0289064 A1    Sep. 16, 2021

(51) Int. Cl.
*H04M 1/04* (2006.01)
*F16M 13/02* (2006.01)
*F16M 11/04* (2006.01)
*F16M 11/38* (2006.01)
*G06F 1/16* (2006.01)

(52) U.S. Cl.
CPC ............ *H04M 1/04* (2013.01); *F16M 11/041* (2013.01); *F16M 11/38* (2013.01); *F16M 13/022* (2013.01); *G06F 1/1626* (2013.01)

(58) Field of Classification Search
CPC ....... H04M 1/04; F16M 11/041; F16M 11/38; F16M 13/022; G06F 1/1626
USPC ....................................................... 455/575.1
See application file for complete search history.

(56) References Cited

U.S. PATENT DOCUMENTS

| 2016/0100675 A1 | 4/2016 | Dong |
| 2017/0339266 A1 | 11/2017 | Pierce |
| 2018/0149302 A1 | 5/2018 | Papapanos et al. |

FOREIGN PATENT DOCUMENTS

WO    2020009809 A1    1/2020

OTHER PUBLICATIONS

Transmittal of the International Search Report and Written Opinion issued in PCT/US2020/021830 dated May 20, 2020.

*Primary Examiner* — Eugene Yun
(74) *Attorney, Agent, or Firm* — Irell & Manella LLP

(57) ABSTRACT

A mount configured to removably and interchangeably receive a plurality of different expandable accessories attached to a portable electronic device. The mount includes an attachment mechanism, a receiving member, and a connecting member having a first end coupled to the attachment mechanism and a second end coupled to the receiving member. The receiving member includes a plurality of legs that are adapted to removably receive a first expandable accessory of the plurality of different expandable accessories and to interchangeably and removably receive a second expandable accessory of the plurality of different expandable accessories, where the second expandable accessory is different from the first expandable accessory.

14 Claims, 16 Drawing Sheets

MOUNT FOR INTERCHANGEABLY RECEIVING VARIOUS EXPANDABLE ACCESSORIES ATTACHED TO A PORTABLE ELECTRONIC DEVICE

FIELD OF THE DISCLOSURE

The present disclosure generally relates to mounts for portable electronic devices and, more particularly, to mounts capable of interchangeably receiving various accessories attached to portable electronic devices.

BACKGROUND

Portable electronic devices, such as MP3 players and smart phones, are often housed in protective covers or cases in order to protect the device from damage, provide a grip for handling the device, and/or provide a stand for propping the device on a surface. Such cases increase the effective size of the device. Expandable accessories, which may be attached directly to the device or to the case protecting the device, are used for a variety of functions, including propping the device on a surface and providing an expandable grip for handling the device.

SUMMARY

In accordance with one aspect, a mount configured to removably receive a plurality of different expandable accessories attached to a portable electronic device is provided. The mount includes an attachment mechanism, a receiving member, and a connecting member having a first end coupled to the attachment mechanism and a second end coupled to the receiving member. The receiving member includes a plurality of legs that are adapted to removably receive a first expandable accessory of the plurality of different expandable accessories. The plurality of legs are also adapted to interchangeably and removably receive a second expandable accessory of the plurality of different expandable accessories, where the second expandable accessory is different from the first expandable accessory.

In accordance with a second aspect, a mounting system for a plurality of different expandable accessories attached to a portable electronic device is provided. The mounting system includes a first expandable accessory adapted to be attached to the portable electronic device, a second expandable accessory adapted to be attached to the portable electronic device, and a mount. The mount includes an attachment mechanism, a receiving member, and a connecting member having a first end coupled to the attachment mechanism and a second end coupled to the receiving member. The receiving member includes a plurality of legs that are adapted to removably receive the first expandable accessory. The plurality of legs are also adapted to interchangeably and removably receive the second expandable accessory.

In accordance with a third aspect, a mounting system for a plurality of different expandable accessories attached to a portable electronic device is provided. The mounting system includes a first expandable accessory adapted to be attached to the portable electronic device, a second expandable accessory adapted to be attached to the portable electronic device and different from the first expandable accessory, and a mount. The first expandable accessory includes a first platform that is securable to the portable electronic device, a first expandable member operably coupled to the first platform, and a first button operably coupled to the first expandable member. The first expandable member may be positionable between a first, collapsed configuration and a second, expanded configuration. The second expandable accessory may be different from the first expandable accessory and includes a second platform that is securable to the portable electronic device, a second expandable member operably coupled to the second platform, and a second button operably coupled to the second expandable member. The second expandable member may be positionable between a first, collapsed configuration and a second, expanded configuration. The mount includes an attachment mechanism, a receiving member, and a connecting member having a first end coupled to the attachment mechanism and a second end coupled to the receiving member. The receiving member includes a plurality of legs that are adapted to removably receive the first expandable accessory, and the plurality of legs are also adapted to interchangeably and removably receive the second expandable accessory.

In some of these and other aspects, the receiving member may further include a body, a first leg of the plurality of legs extends outwardly from a first end of the body along a first axis, and a second leg of the plurality of legs extends outwardly from a second end of the body along a second axis substantially parallel to the first axis.

In some of these and other aspects, the receiving member may have a substantially U-shaped profile.

In some of these and other aspects, the receiving member may have an arch-shaped profile.

In some of these and other aspects, the receiving member may include a sloped surface disposed on an inner surface of the receiving member. The sloped surface may be disposed between the plurality of legs.

In some of these and other aspects, the sloped surface may include at least one concave portion and at least one convex portion.

In some of these and other aspects, the receiving member may also include a protrusion extending from an inner surface of the receiving member.

In some of these and other aspects, the second expandable accessory has one or more of a different shape, a different size, and different functionality than the first expandable accessory.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, in which:

DETAILED DESCRIPTION

The present disclosure is generally directed to a mount that is configured to removably and interchangeably receive a plurality of different expandable accessories attached to a portable electronic device (either the same portable electronic device or different portable electronic devices), such that the mount is configured to retain the portable electronic device without having to remove the expandable accessory attached thereto and regardless of which kind of expandable accessory is attached thereto. In particular, the disclosed mount includes an attachment mechanism, a receiving member, and a connection member that is coupled to the disc and the receiving member. The receiving member is configured to not only interchangeably receive the plurality of different expandable accessories, but is also configured to receive the plurality of different expandable accessories in various expanded configurations. For example, the receiving member of the disclosed mount can removably receive a first expandable accessory in a first expanded configuration, a second expanded configuration different from the first expanded configuration, and a third expanded configuration different from both the first and second expanded configurations without the need for modifying or altering the first expandable accessory or the receiving member. The receiving member of the disclosed mount may also receive a second expandable accessory different from the first expandable accessory without the need for modifying or altering the second expandable accessory or the receiving member.

Figure 5:
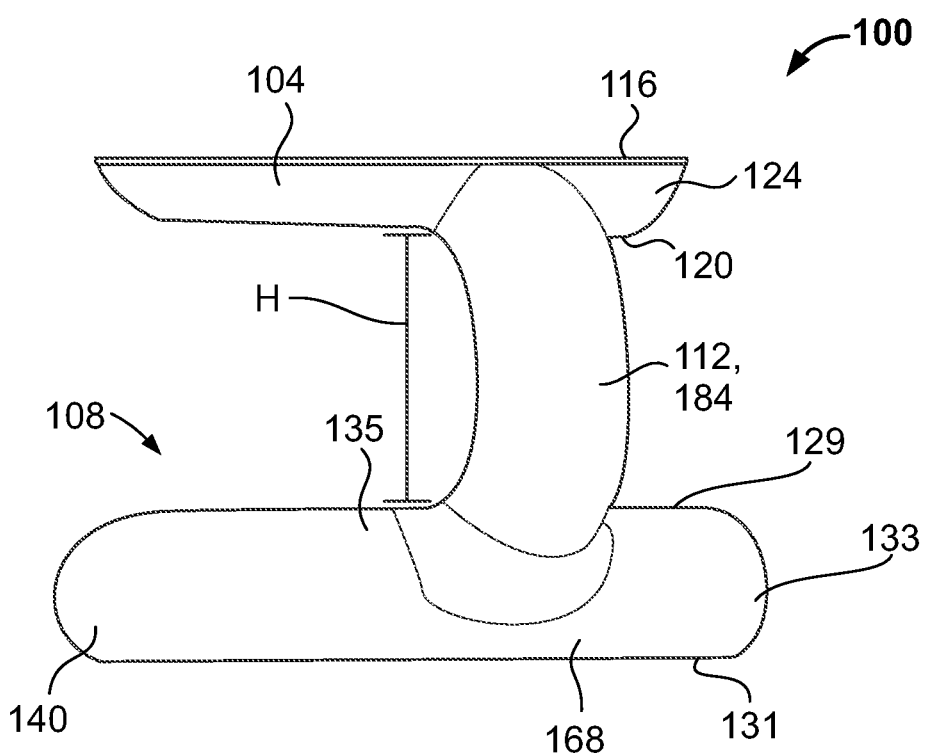
FIG. 5 is a side view of the mount of FIG. 1.

FIGS. 1-5 illustrate a first example of a mount 100 constructed in accordance with the teachings of the present invention. As such, the mount 100 is configured to removably and interchangeably receive a plurality of different expandable accessories attached to a portable electronic device. The mount 100 includes an attachment mechanism 104, a receiving member 108, and a connecting member 112 having a first end 112a coupled to (e.g., integrally formed with) the attachment mechanism 104 and a second end 112b coupled to (e.g., integrally formed with) the receiving member 108. The attachment mechanism 104 includes an upper surface 116, a lower surface 120, and a rounded edge 124 extending between the upper surface 116 and the lower surface 120. As best illustrated in FIG. 5, the upper surface 116 of the attachment mechanism 104 may be larger than the lower surface 120. In other words, the upper surface 116 of the attachment mechanism 104 may have a first diameter and the lower surface 120 of the attachment mechanism 104 may have a second diameter less than the first diameter. In other examples, however, the upper surface 116 of the attachment mechanism 104 can be the same size as the lower surface 120 of the attachment mechanism 104. In yet other examples, the upper surface 116 of the attachment mechanism 104 can be smaller than the lower surface 120 of the attachment mechanism 104. While not illustrated in FIGS. 1-5, the upper surface 116 of the attachment mechanism 104 may include any means for securing the mount 100 to a surface. For example, the mount 100 may be secured to a surface, via the attachment mechanism, by an adhesive (e.g., Velcro), an aperture adapted to receive a head of a screw, or a threaded opening adapted to receive a fastener.

While the exemplary attachment mechanism 104 is depicted as a disc-like structure, it should be appreciated that the attachment mechanism 104 may comprise any number of different shapes or forms and need not be round or even planar. For example, the attachment mechanism 104 may comprise a clamp or other known attachment structure. The receiving member 108 is generally configured to interchangeably removably receive a plurality of different expandable accessories. In particular, the receiving member 108 is configured to removably receive a first expandable accessory of the plurality of different expandable accessories and to interchangeably and removably receive a second expandable accessory of the plurality of different expandable accessories, where the second expandable accessory is different from the first expandable accessory.

The receiving member 108 in this example has a substantially U-shaped profile defined by a body 127 and a plurality of legs 128. As best illustrated in FIGS. 1-5, the connecting member 112 is coupled to the body 127 and the plurality of legs 128 extend outwardly from the body 127. The body 127 includes an upper surface 129 (FIG. 5), a lower surface 131 (FIG. 5), a curved portion 133 (FIG. 5) that extends from the upper surface 129 to the lower surface 131, a first end 135, and a second end 137 that is opposite the first end 135. The plurality of legs 128 includes a first leg 128a extending from the first end 135 of the body 127 and a second leg 128b extending from the second end 137 of the body 127. The first leg 128a extends outwardly from the first end 135 of the body 127 along a first axis 136 and terminates at a first tip 140. Similarly, the second leg 128b extends outwardly from the second end 137 of the body 127 along a second axis 152 that is substantially parallel, if not entirely parallel, to the first axis 136 and terminates at a second tip 156. In other examples, the receiving member 108 can have a different shape than the receiving member 108 illustrated in FIGS. 1-5. For example, the receiving member 108 can have an arc shaped profile. In other examples, the receiving member 108 can also have more than two legs (e.g., the receiving member 108 can have three, four, five, . . . , $n^{th}$ number of legs).

Figure 2:
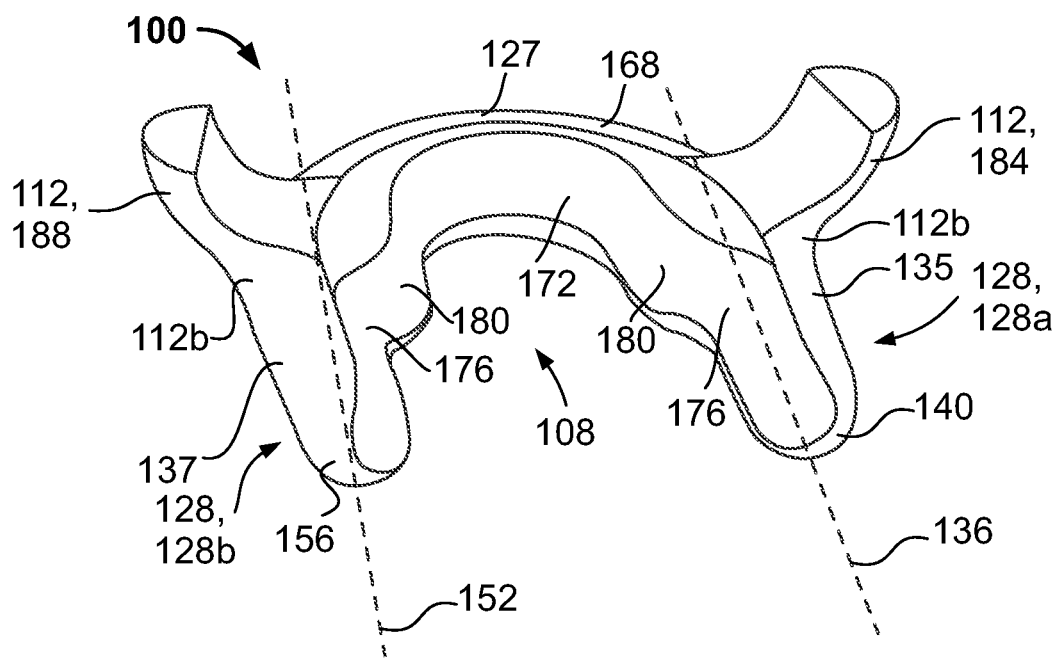
FIG. 2 is similar to FIG. 1, but with an attachment mechanism of the mount removed for clarity.
Figure 3:
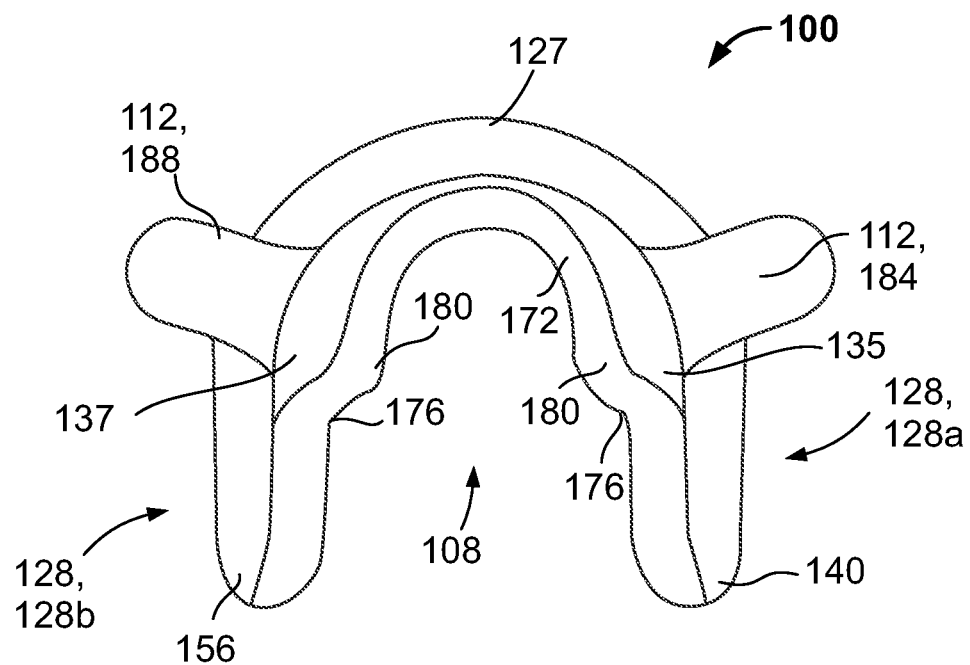
FIG. 3 is a top view of FIG. 2.
Figure 4:
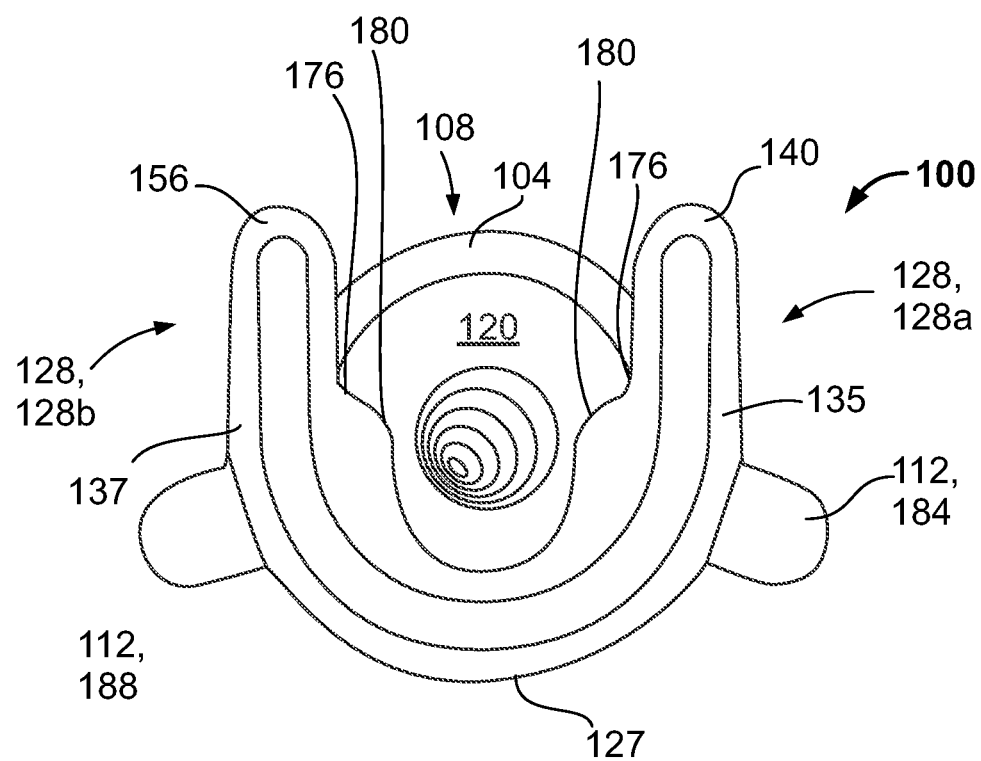
FIG. 4 is a bottom view of the mount of FIG. 1.

The receiving member 108 also includes an inner surface 164 and an outer surface 168 defined by the body 127 and the plurality of legs 128. The receiving member 108 further includes a sloped surface 172 that is disposed on the body 127 (and in some cases, on the plurality of legs 128 as well) between the plurality of legs 128. In particular, as illustrated in FIG. 2, the sloped surface 172 is arranged on the inner surface 164 and extends from the first leg 128a to the second leg 128b. As illustrated in FIG. 2, the sloped surface 172 can, in some cases, include at least one concave portion 176 and at least one convex portion 180. In any case, the sloped surface 172 is thus configured to removably receive and removably retain at least a portion of an expandable accessory of the plurality of different expandable accessories, as will be discussed in greater detail below.

Figure 1:
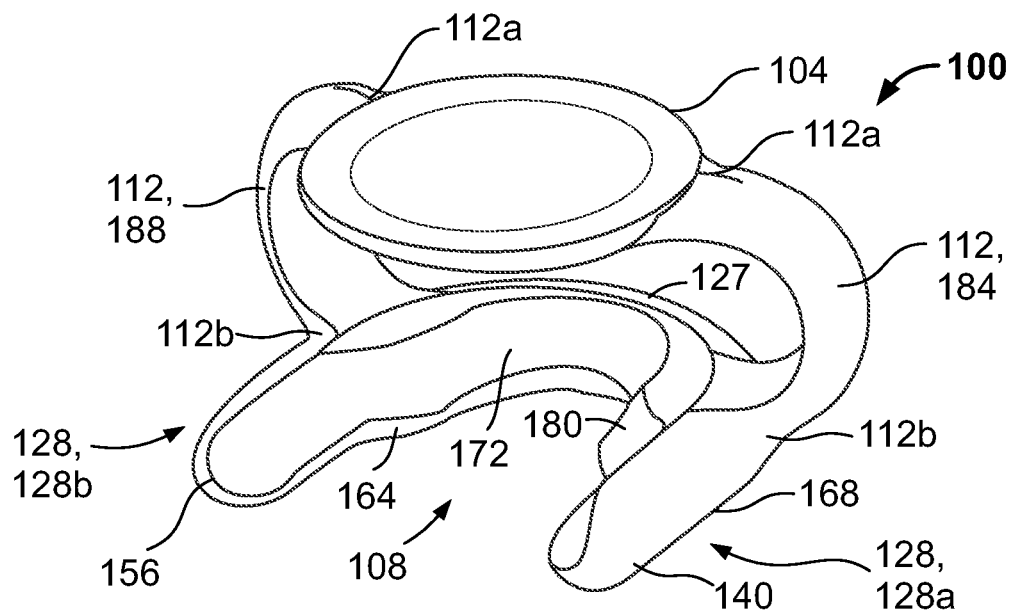
FIG. 1 is a perspective view of a first example of a mount constructed in accordance with the teachings of the present disclosure.

Coupling the attachment mechanism 104 to the receiving member 108 is the connecting member 112. As illustrated in FIG. 1, the connecting member 112 includes a first bridge 184 and a second bridge 188, each extending between the attachment mechanism 104 and the receiving member 108. In particular, the first and second bridges 184, 188 extend from the attachment mechanism 104 to the body 127 of the receiving member 108, with the first bridge 184 disposed opposite of the second bridge 188. The first bridge 184 curves between the attachment mechanism 104 and the receiving member 108 at a first side of the attachment mechanism 104 and the second bridge 188 curves between the attachment mechanism 104 and the receiving member 108 at a second side of the attachment mechanism 104 that is opposite the first side. However, in other examples, the first and second bridges 184, 188 can be placed closer or further apart from one another than is depicted in FIG. 1. Further, the first and second bridges 184, 188 have a height H (FIG. 5) that permits the receiving member 108 of the mount 100 to removably receive and removably retain an expandable accessory of the plurality of different expandable accessories regardless of the expanded configuration the expandable accessory is in. In this example, the height H of the first and second bridges 184, 188 is greater than a height of the expandable accessory when the expandable accessory is in a fully expanded configuration. However, in other examples, the height H of the first and second bridges 184, 188 can be a height that is less than or equal to a height of the expandable accessory when the expandable accessory is in a fully expanded configuration.

Figure 6:
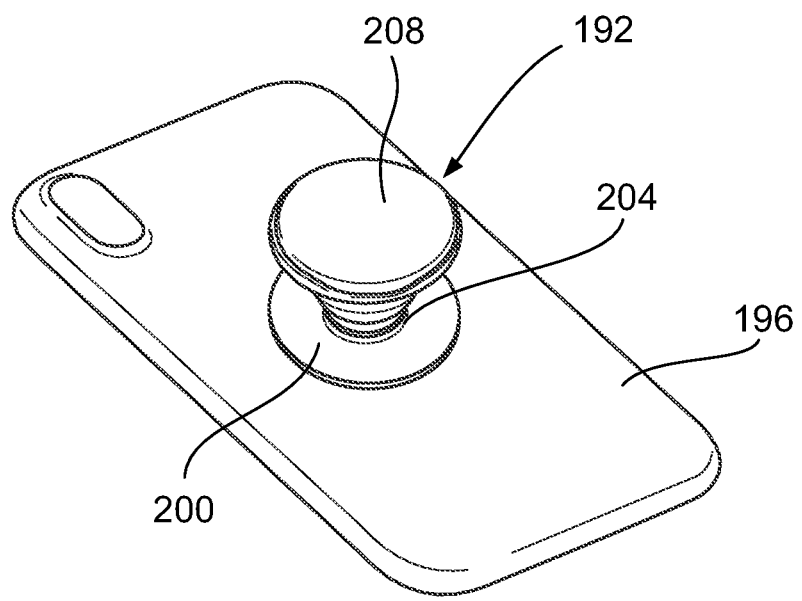
FIG. 6 is a perspective view of a first example of an expandable accessory attached to an example of portable electronic device, constructed in accordance with the teachings of the present disclosure.

FIG. 6 illustrates a first example of an expandable accessory 192 attached (directly or indirectly) to an example portable electronic device 196, constructed in accordance with the teachings of the present disclosure. In the example illustrated in FIG. 6, the first expandable accessory 192 includes a first platform 200 securable to the portable electronic device 196, a first expandable member 204, and a first button 208. The first expandable member 204 is operably coupled to the first platform 200, and the first button 208 is operably coupled to the first expandable member 204 opposite the first platform 200. The first expandable member 204 is positionable (by a user of the accessory 192) between a first, partially expanded configuration (FIG. 7) and a second, fully expanded configuration (FIG. 9). In some examples, the first expandable member 204 can be positioned (by the user) in a third, partially expanded configuration (FIG. 8) that is intermediate the first configuration and the second configuration. In other words, when the first expandable member 204 is in the third, partially expanded configuration, the first expandable member 204 is expanded to a greater degree than in the first, partially expanded configuration (FIG. 7), but to a lesser degree than in the second, fully expanded configuration (FIG. 9). While not illustrated herein, the first expandable member 204 can also be positioned (by the user) in a fully collapsed configuration.

Figure 7:
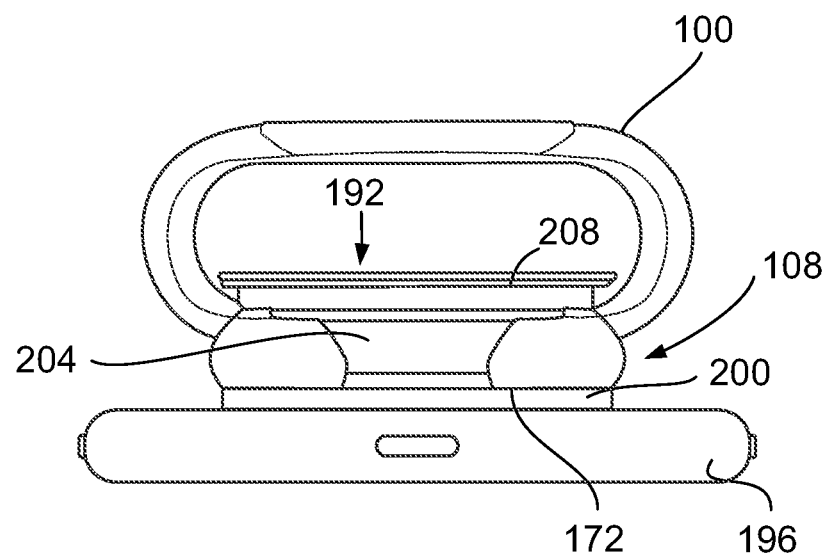
FIG. 7 is a plan view of the expandable accessory of FIG. 6 attached to the mount of FIG. 1 and in a first expanded configuration.
Figure 8:
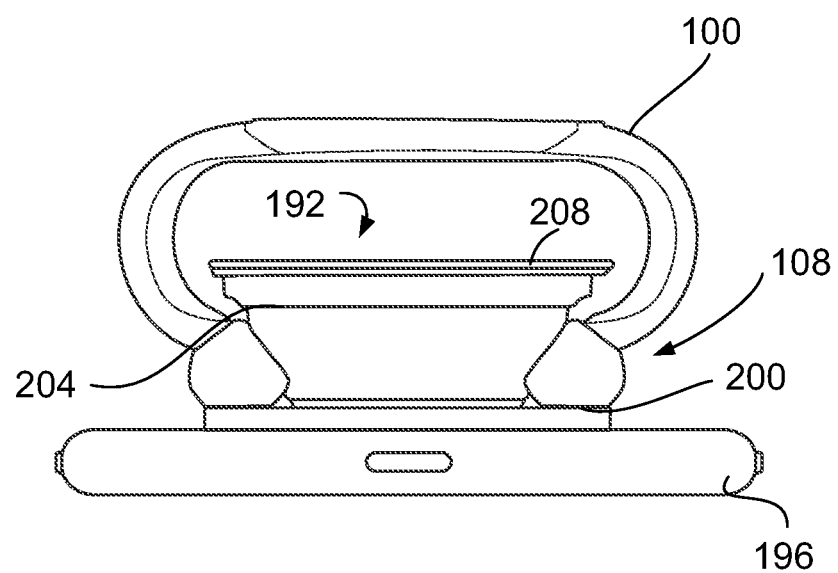
FIG. 8 is similar to FIG. 7 but shows the expandable accessory in a second expanded configuration.
Figure 9:
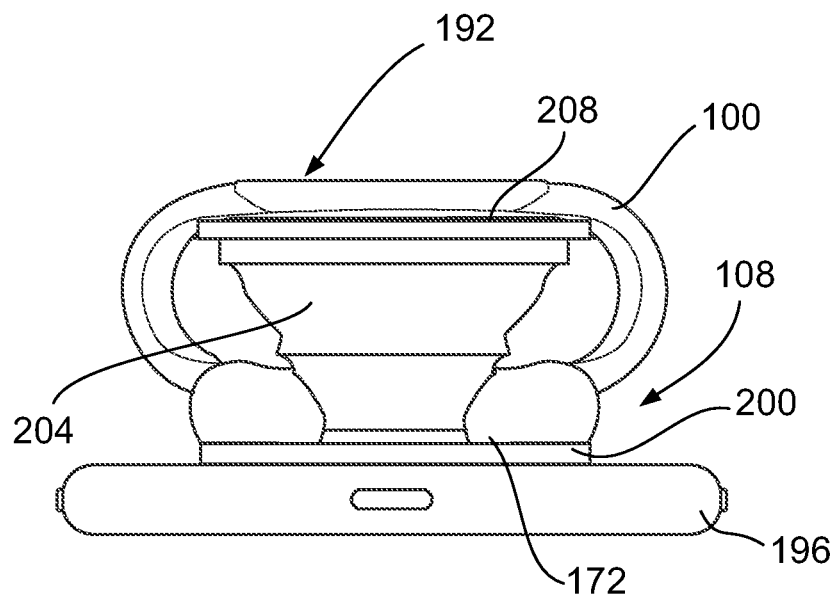
FIG. 9 is similar to FIG. 7, but shows the expandable accessory in a third expanded configuration.

After or before the first expandable accessory 192 is attached to the portable electronic device 196, the first expandable accessory 192 can be removably attached to the mount 100 by placing the first expandable accessory 192 in the receiving member 108 of the mount 100, as illustrated in FIGS. 7-9. More particularly, the first expandable accessory 192 can be removably received and retained by the mount 192 by laterally or horizontally sliding the first expandable accessory 192 into the receiving member 108. Once the second expandable accessory 392 is attached to the mount 100, the second expandable accessory 392 can be received and retained in the receiving member 108 in the first, second, and intermediate configurations (and can be moved between any of these configurations while so retained). FIG. 7 illustrates the first expandable accessory 192 being received and retained by the receiving member 108 in the first, partially expanded configuration. FIG. 8 illustrates the first expandable accessory 192 being received and retained by the receiving member 108 in the third, partially expanded (i.e., intermediate) configuration. FIG. 9 illustrates the first expandable accessory 192 being received and retained by the receiving member 108 in the second, fully expanded configuration. In each of the first, partially expanded configuration, the second, fully expanded configuration, and the third, partially expanded configuration, at least a portion of the first expandable accessory 192 is received and retained by the body 127 and the plurality of legs 128 of the receiving member 108. In particular, in each of the first, second, and third configurations, at least a portion of the first expandable member 204 engages the sloped surface 172. More particularly, in each of the first, second, and third configurations, the first at least a portion of the first expandable member 204 engages the sloped surface 172 by virtue of the concave 176 and convex 180 surfaces forming the sloped surface 172. Further, the button 208 has an outer diameter that is larger than the diameter of the inner surface 164 of the mount 100, such that the button 208 is securely retained between the attachment mechanism 104, the upper surface 129 of the receiving member 108, and the bridges 184, 188 of the connecting member 112.

Figure 10:
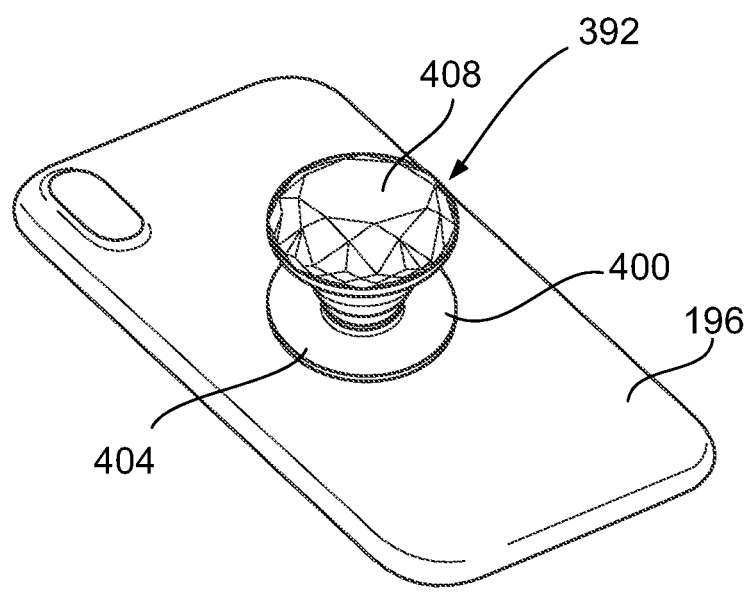
FIG. 10 is a perspective view of a second example of an expandable accessory attached to an example of a portable electronic device, constructed in accordance with the teachings of the present disclosure.

FIG. 10 illustrates a second example of an expandable accessory 392 constructed in accordance with the teachings of the present disclosure. The second expandable accessory 392 is attached to the portable electronic device 196 but may instead be attached to a different portable electronic device. The second expandable accessory 392 is similar to the first expandable accessory 192 in that it similarly includes a second platform 400 securable to the portable electronic device 196, a second expandable member 404 operably coupled to the second platform 400, and a second button 408 operably coupled to the second expandable member 404. However, the second expandable accessory 392 is different from the first expandable accessory 192, because unlike the first expandable accessory 192, the second expandable accessory 392 includes an aesthetic feature that is coupled to the button 408. For example, the aesthetic feature can be a gem, a stone, or a printed or otherwise deposited design or logo. The aesthetic feature can be removably coupled to the button 408 or fixedly coupled to the button 408. For example, the aesthetic feature can be integrally formed with the button 408.

Figure 11:
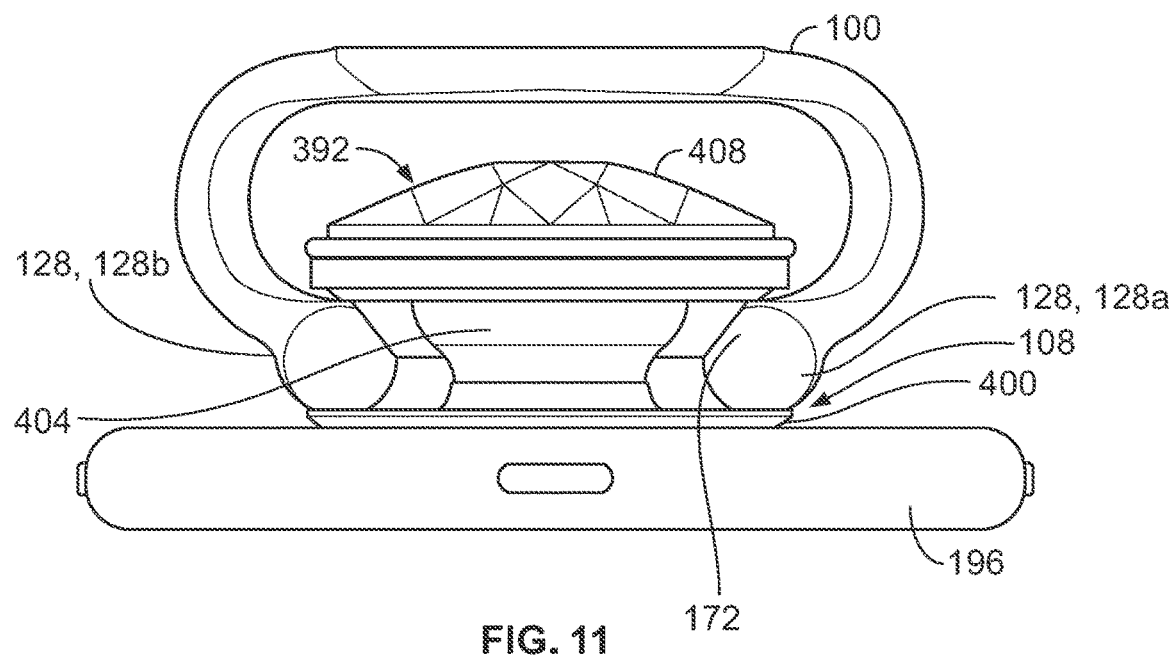
FIG. 11 is a plan view of the expandable accessory of FIG. 10 attached to the mount of FIG. 1 and in a first expanded configuration
Figure 12:
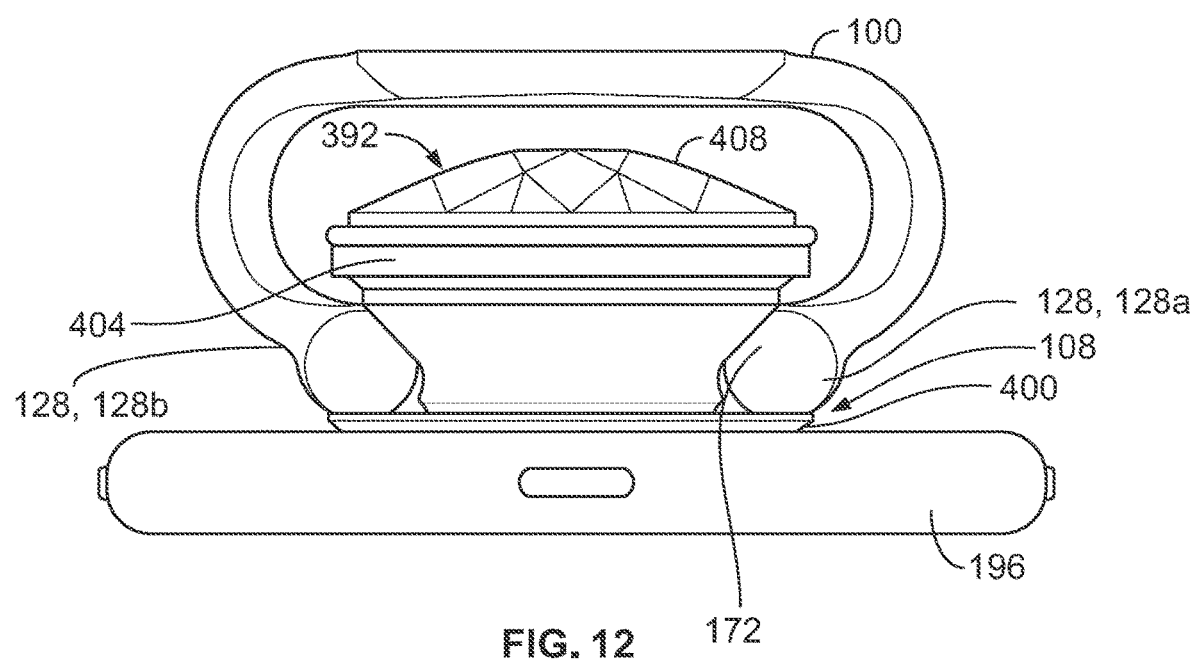
FIG. 12 is similar to FIG. 11, but shows the expandable accessory in a second expanded configuration.

In any event, like the second expandable member 204, the second expandable member 404 is positionable (by the user) between a first, partially expanded configuration (FIG. 11) and a second, fully expanded configuration (FIG. 12). In some examples, the second expandable member 404 can be positioned (by the user) in an intermediate configuration (not illustrated) where the second expandable member 404 is expanded to a greater degree than in the first, partially expanded configuration (FIG. 11), but to a lesser degree than in the second, fully expanded configuration (FIG. 12).

After or before the second expandable accessory 392 is attached to the portable electronic device 196, the second expandable accessory 392 can be removably attached to the mount 100 by placing the second expandable accessory 392 in the receiving member 108 of the mount 100, as illustrated in FIGS. 11 and 12. More particularly, the second expandable accessory 392 can be removably received and retained by the mount 100 by laterally or horizontally sliding the second expandable accessory 392 into the receiving member 108. Once the second expandable accessory 392 is attached to the mount 100, the second expandable accessory 392 can be received and retained in the receiving member 108 in the first, second, and intermediate configurations (and can be moved between any of these configurations while so retained). FIG. 11 illustrates the second expandable accessory 392 being removably received and removably retained by the receiving member 108 in the first, partially expanded configuration, and FIG. 12 illustrates the second expandable accessory 392 being removably received and removably retained by the receiving member 108 in the second, fully expanded configuration. In each of the first and second configurations, as well as the intermediate configuration (not illustrated), at least a portion of the second expandable accessory 392 is received and retained by the body 127 and the plurality of legs 128 of the receiving member 108. In particular, in each of the first, second, and intermediate configurations, at least a portion of the second expandable member 304 engages the sloped surface 172. More particularly, in each of the first, second, and intermediate configurations, at least a portion of the second expandable member 304 engages the sloped surface 172 by virtue of the concave portion 176 and the convex portion 180. Further, the button 408 has an outer diameter that is larger than the diameter of the inner surface 164 of the mount 100, such that the button 408 is securely retained between the attachment mechanism 104, the upper surface 129 of the receiving member 108, and the bridges 184, 188 of the connecting member 112.

Figure 13:
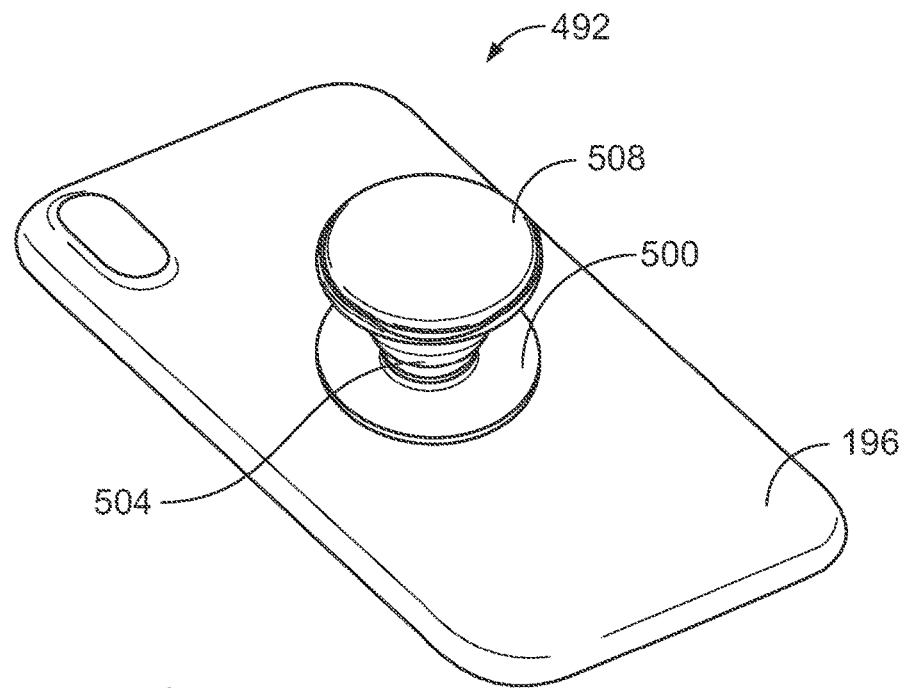
FIG. 13 is a perspective view of a third example of an expandable accessory attached to an example of a portable electronic device, constructed in accordance with the teachings of the present disclosure.

FIG. 13 illustrates a third example of an expandable accessory 492 constructed in accordance with the teachings of the present disclosure. The third expandable accessory 492 is attached to the portable electronic device 196, but may instead be attached to a different portable electronic device. The third expandable accessory 492 is similar to the first and second expandable accessories 192, 392 in that it similarly includes a third platform 500 securable to the portable electronic device 196, a third expandable member 504 operably coupled to the third platform 500, and a third button 508 operably coupled to the third expandable member 504. However, the third expandable accessory 492 is different, because unlike the first and second expandable accessories 192, 392, the third expandable accessory 492 has a storage compartment defined by an inner volume of the third button 508, and the third button 508 includes a notch that allows a user to insert their finger or other object to open or close the storage compartment. In this example, the storage compartment is dimensioned to accommodate a first mirror (not shown). The storage compartment may also accommodate a second mirror that has a different magnification than the first mirror. In other examples, however, the storage compartment need not include any mirrors. Additionally or alternatively, the storage compartment may also accommodate a cosmetic product or any other object, which may be removably and/or releasably stored therein.

Figure 14:
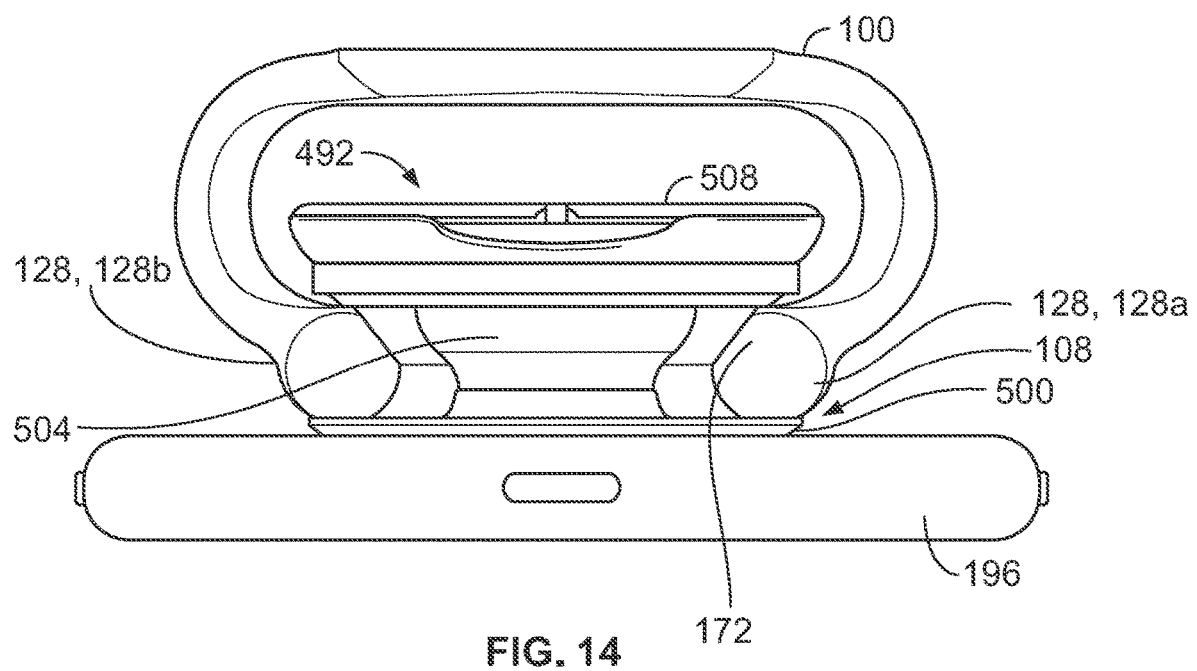
FIG. 14 is a top view of the expandable accessory of FIG. 13 attached to the mount of FIG. 1 and in a first expanded configuration.
Figure 15:
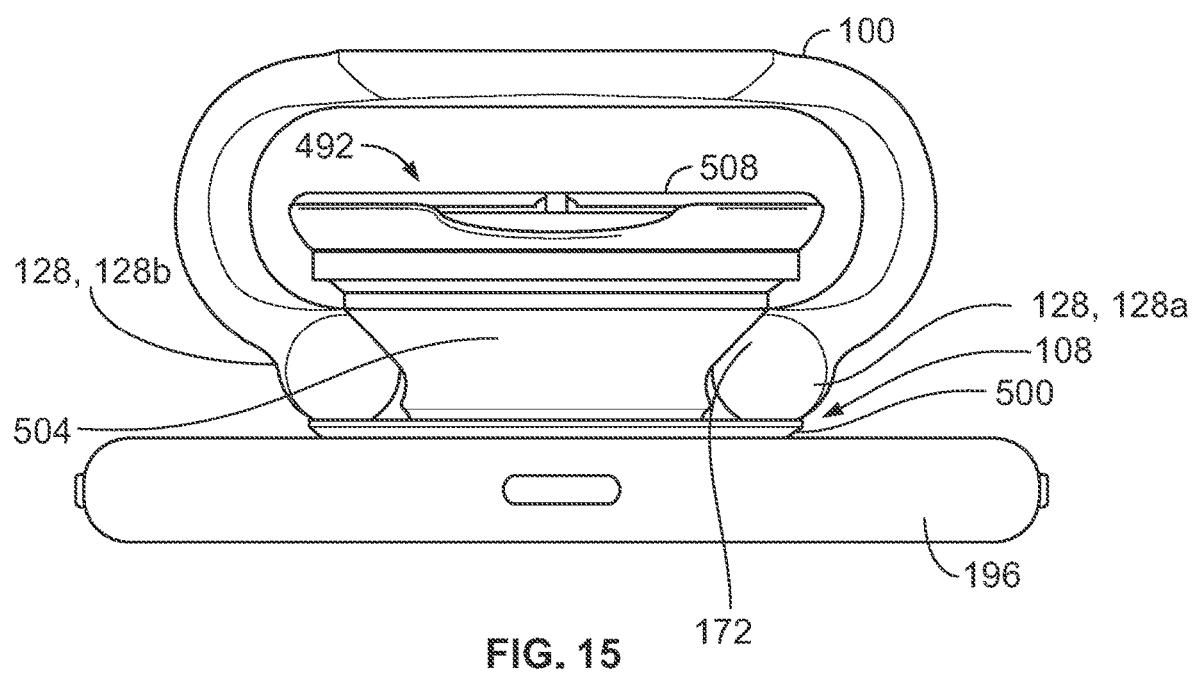
FIG. 15 is similar to FIG. 14 but shows the expandable accessory in a second expanded configuration.

In any event, like the second and third expandable members 204, 404, the third expandable member 504 is positionable (by the user) between a first, partially expanded configuration (FIG. 14) and a second, fully expanded configuration (FIG. 15). In some examples, the third expandable member 492 can be positioned (by the user) in an intermediate configuration (not illustrated) where the third expandable member 492 is expanded to a greater degree than the first, partially expanded configuration (FIG. 14), but to a lesser degree than the second, fully expanded configuration (FIG. 15).

After or before the third expandable accessory 492 is attached to the portable electronic device 196, the third expandable accessory 492 can be removably attached to the mount 100 by placing the third expandable accessory 492 in the receiving member 108 of the mount 100, as illustrated in FIGS. 14 and 15. More particularly, the third expandable accessory 492 can removably received and retained by the mount 100 by laterally or horizontally sliding the third expandable accessory 492 into the receiving member 108. Once the third expandable accessory 492 is attached to the mount 100, the third expandable accessory 492 can be received and retained in the receiving member 108 in the first, second, and intermediate configurations (and can be moved between any of these configurations while so retained). FIG. 14 illustrates the third expandable accessory 492 being removably received and removably retained by the receiving member 108 in the first, partially expanded configuration and FIG. 15 illustrates the third expandable accessory 492 being removably received and removably retained by the receiving member 108 in the second, fully expanded configuration. In each of the first and second configurations, as well as the intermediate configuration (not illustrated), at least a portion of the third expandable accessory 492 is received by the body 127 and the plurality of legs 128 of the receiving member 108. In particular, at least a portion of the third expandable member 504 engages the sloped surface 172. More particularly, in each of the first, second, and intermediate configurations, at least a portion of the third expandable member 504 engages the sloped surface 172 by virtue of the concave portion 176 and the convex portion 180 of the sloped surface 172. Further, the button 508 has an outer diameter that is larger than the diameter of the inner surface 164 of the mount 100, such that the button 408 is securely retained between the attachment mechanism 104, the upper surface 129 of the receiving member 108, and the bridges 184, 188 of the connecting member 112.

Figure 16:
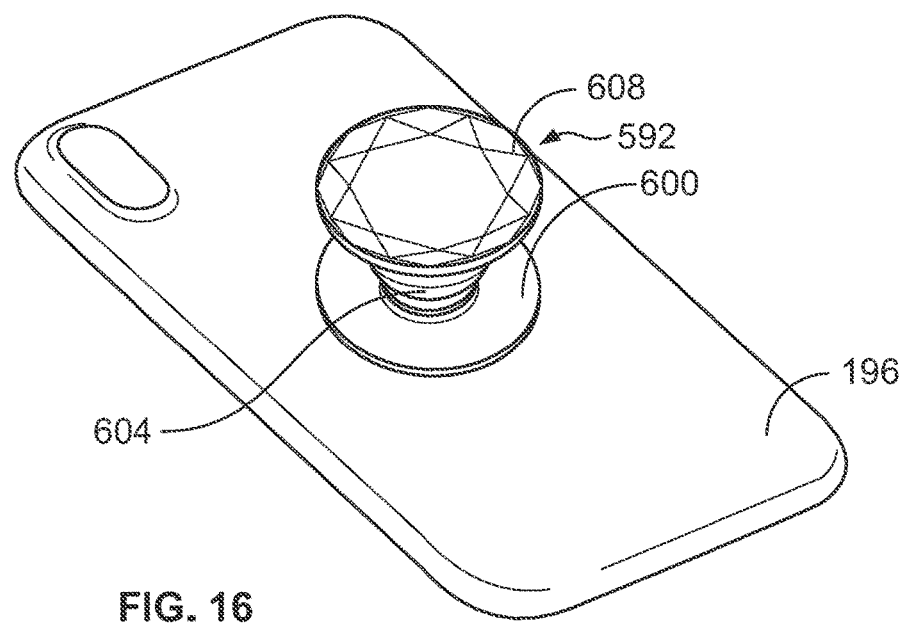
FIG. 16 is a perspective view of a fourth example of an expandable accessory attached to an example of a portable electronic device, constructed in accordance with the teachings of the present disclosure.

FIG. 16 illustrates a fourth example expandable accessory 592 attached to the example portable electronic device 196, constructed in accordance with the teachings of the present disclosure. The fourth expandable accessory 592 is attached to the portable electronic device 196, but may instead be attached to a different portable electronic device. The fourth expandable accessory 592 is similar to the first, second, and third expandable accessories 192, 392, 492 in that it similarly includes a fourth platform 600 securable to the portable electronic device 196, a fourth expandable member 604 operably coupled to the fourth platform 600, and a fourth button 608 operably coupled to the fourth expandable member 604. However, the fourth expandable accessory 592 is different from the other accessories 192, 492, because unlike the first and third expandable accessories 192 492, the fourth expandable accessory 492 includes another aesthetic feature coupled to the fourth button 608. In this example, the aesthetic feature of the fourth button 608 is a raised, colored surface having a geometric pattern. The aesthetic feature of the fourth button 608 may be any color desired by the user as well as any geometric pattern desired by the user. For example, the geometric pattern can be a triangular pattern, a hexagonal pattern, a circular pattern, or some other pattern. In some examples, the aesthetic feature of the fourth button 608 can be fixedly coupled to the fourth button 608 and, in other examples, the aesthetic feature can be releasably coupled to the fourth button 608.

Figure 17:
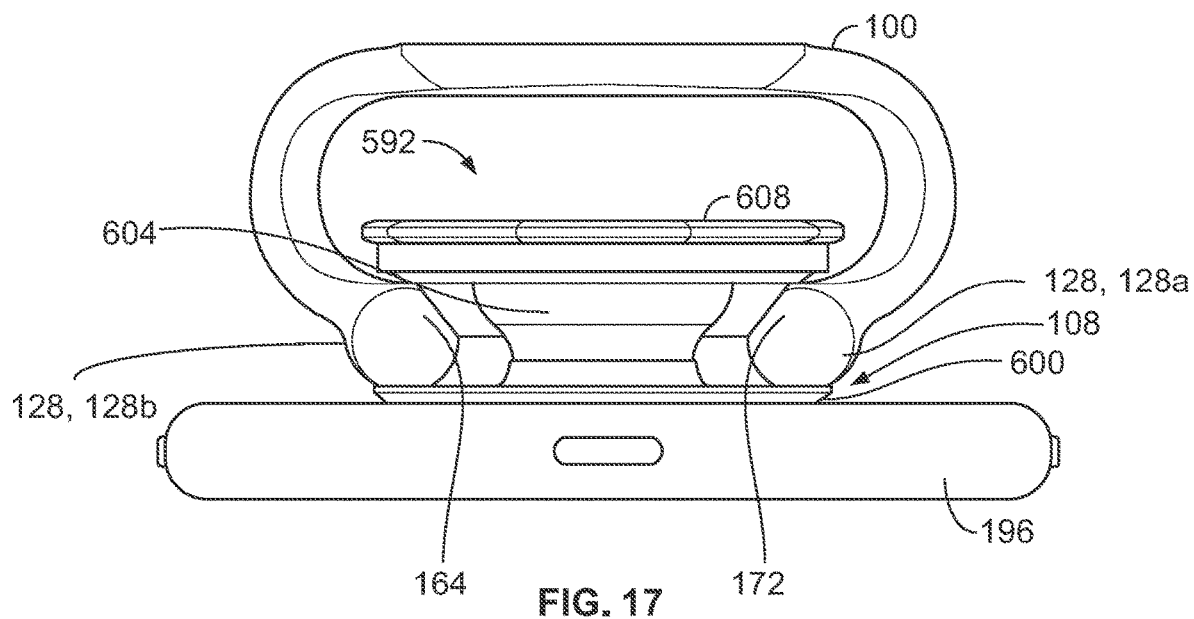
FIG. 17 is a top view of the expandable accessory of FIG. 16 attached to the mount of FIG. 1 and in a first expanded configuration.
Figure 18:
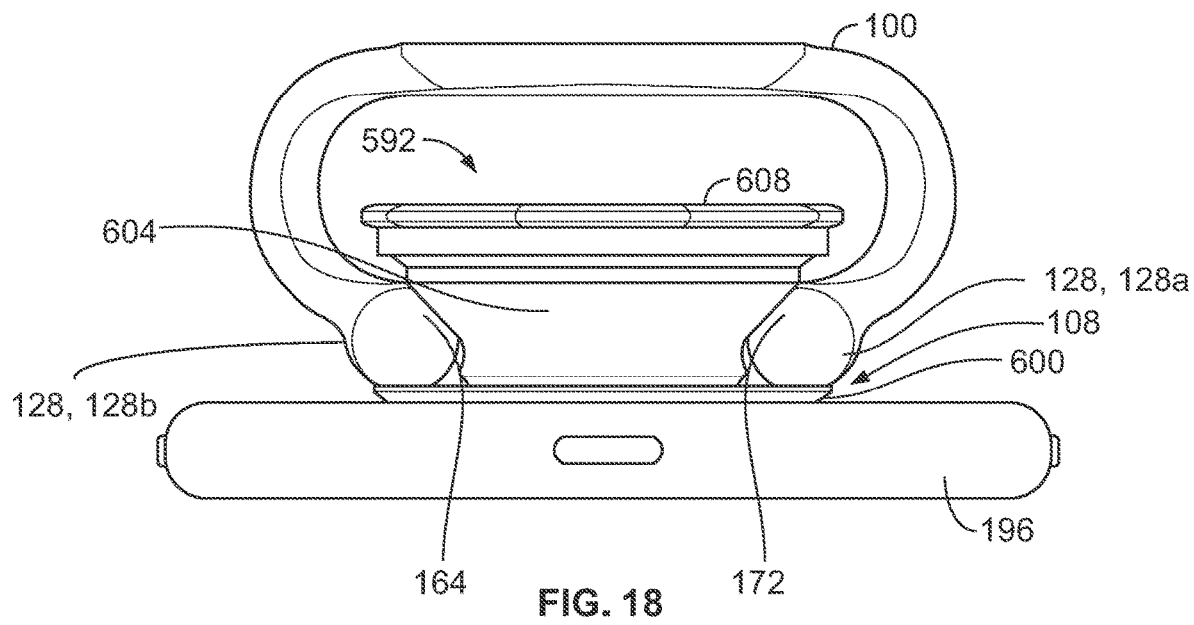
FIG. 18 is similar to FIG. 17, but shows the expandable accessory in a second expanded configuration.
Figure 19:
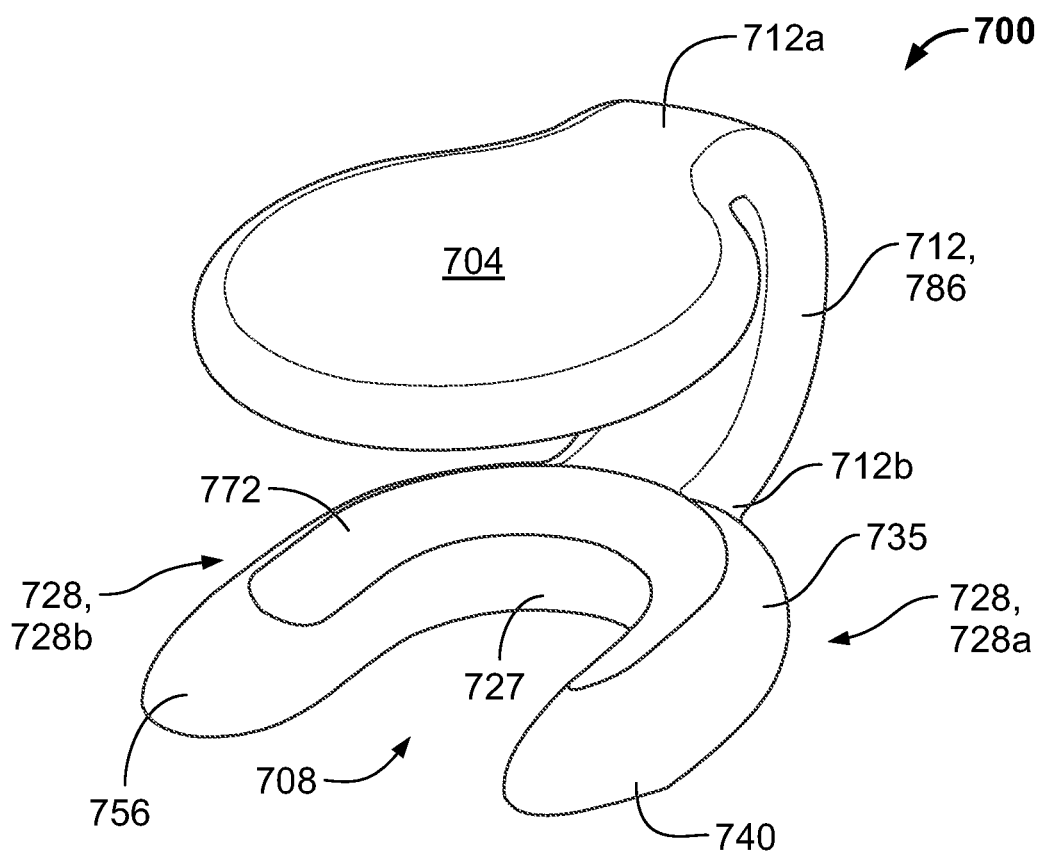
FIG. 19 is a perspective view of a second example of a mount, constructed in accordance with the teachings of the present disclosure.
Figure 20:
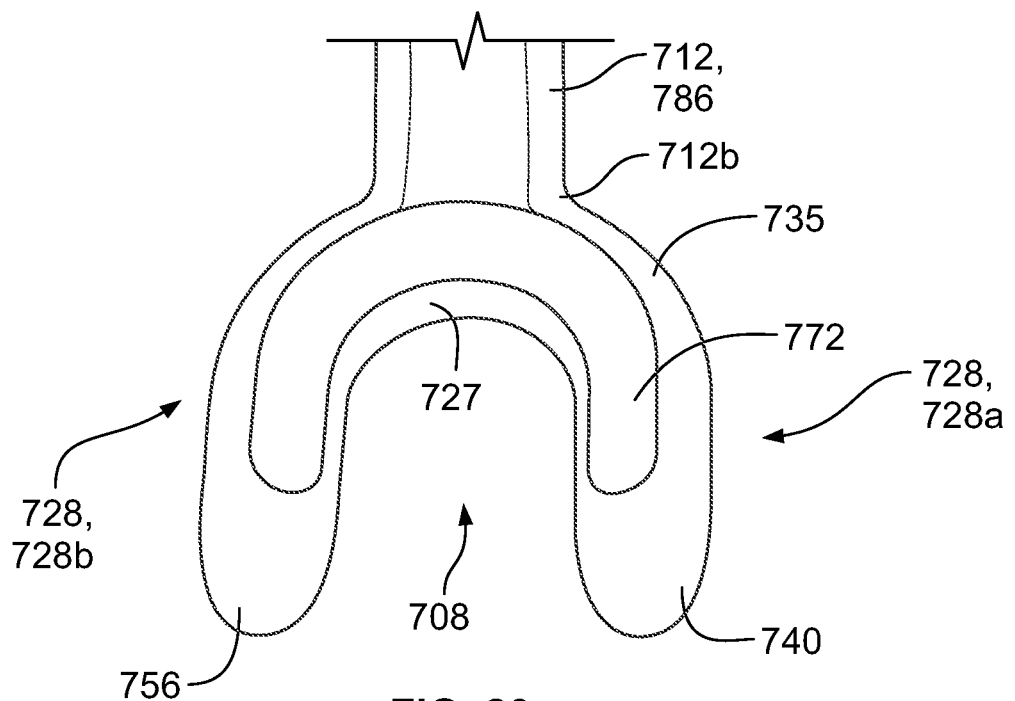
FIG. 20 is similar to FIG. 19, but with an attachment mechanism of the mount removed for clarity.
Figure 21:
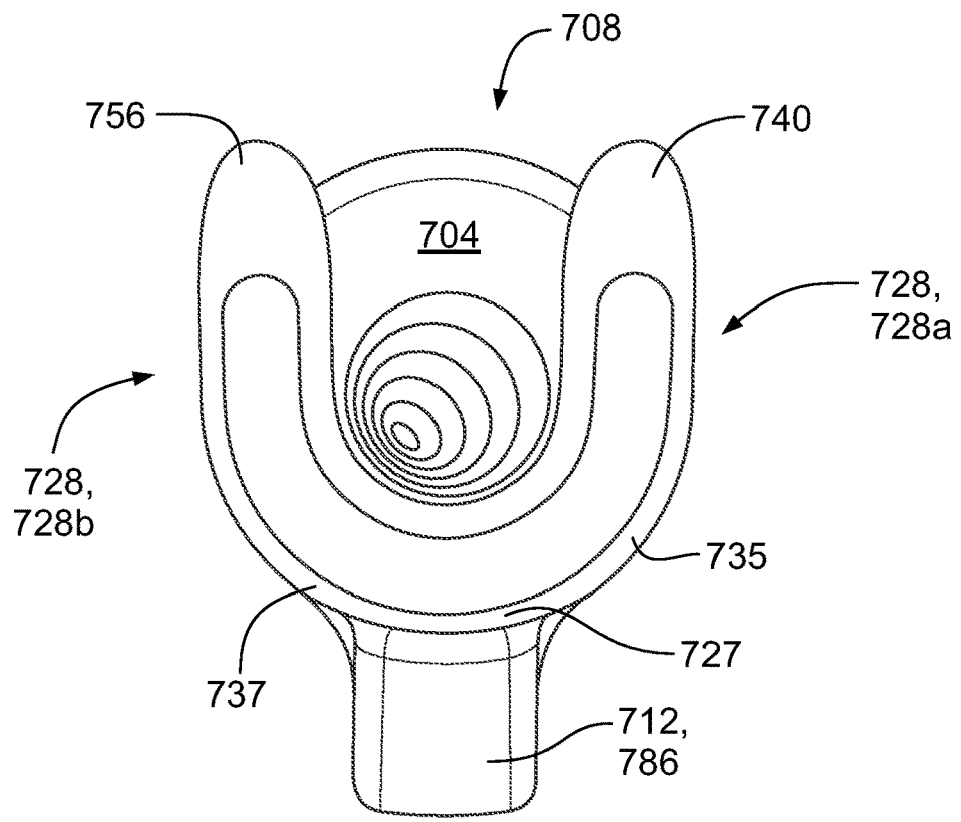
FIG. 21 is a bottom view of the mount of FIG. 19.
Figure 22:
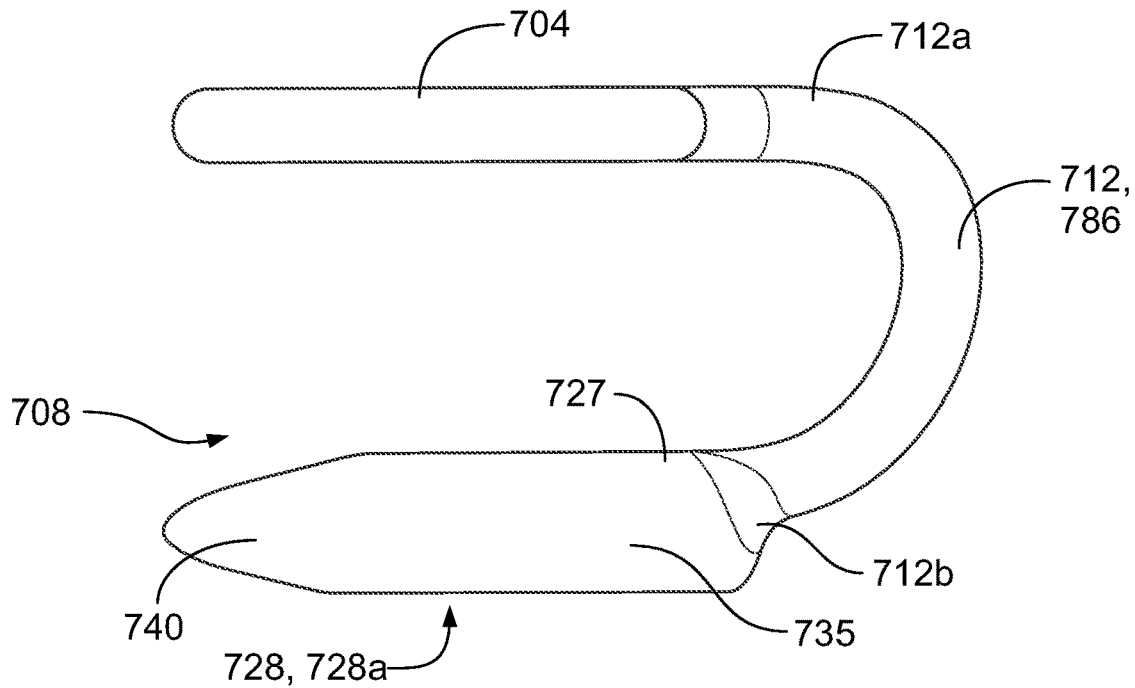
FIG. 22 is a side view of the mount of FIG. 19.
Figure 23:
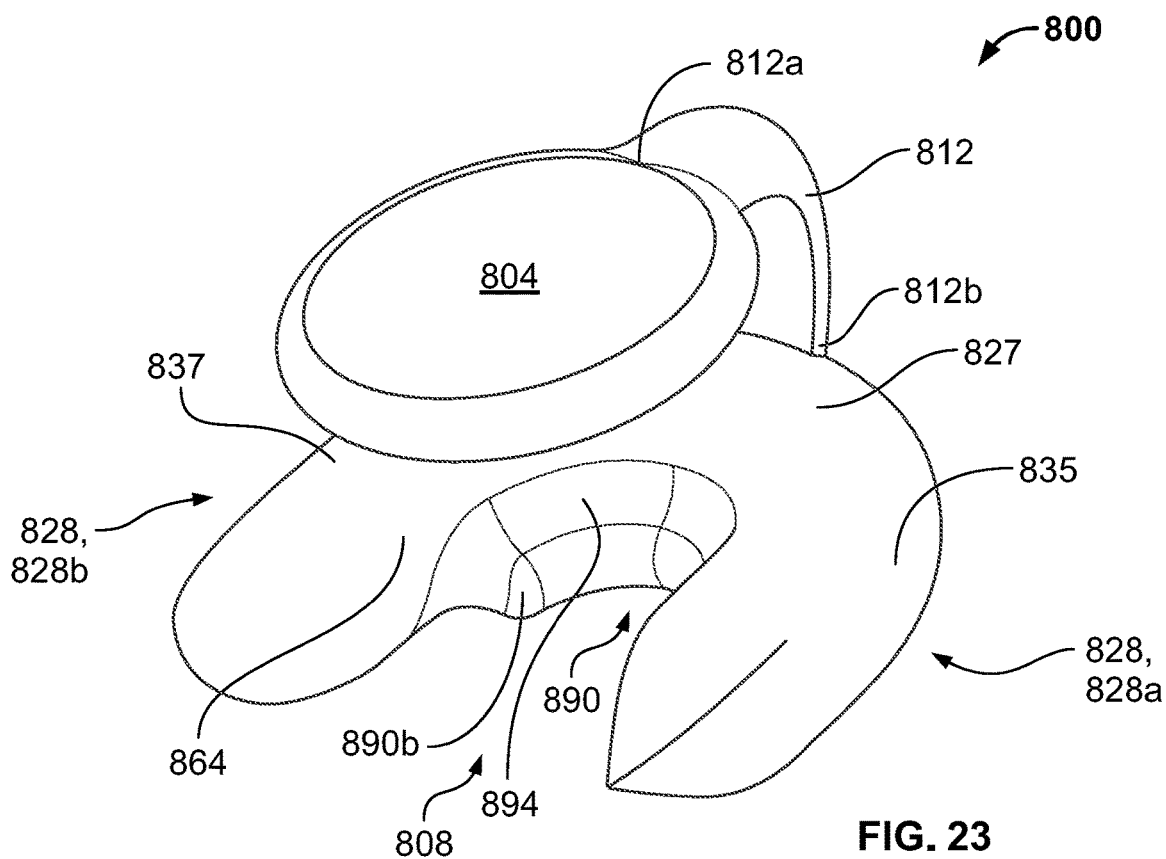
FIG. 23 is a perspective view of a third example of a mount, constructed in accordance with the teachings of the present disclosure.

In any event, like the expandable members 204, 404, and 504, the fourth expandable member 604 is positionable (by the user) between a first, partially expanded configuration (FIG. 17) and a second, fully expanded configuration (FIG. 18). In some examples, the fourth expandable member 592 can be positioned (by the user) in an intermediate configuration (not illustrated) where the fourth expandable member 504 is expanded to a greater degree than the first, partially expanded configuration (FIG. 17), but to a lesser degree than the second, fully expanded configuration (FIG. 18). After or before the fourth expandable accessory 592 is attached to the portable electronic device 196, the fourth expandable accessory 592 can be removably attached to the mount 100 by placing the fourth expandable accessory 592 in the receiving member 108 of the mount 100, as illustrated in FIGS. 17 and 18. More particularly, the fourth expandable accessory 592 can be removably received and retained by the mount 100 by laterally or horizontally sliding the fourth expandable accessory 592 into the receiving member 108. Once the fourth expandable accessory 592 is attached to the mount 100, the fourth expandable accessory 592 can be received and retained in the receiving member 108 in the first, second, and intermediate configurations (and can be moved between any of these configurations while so retained). FIG. 17 illustrates the fourth expandable accessory 592 being removably received and removably retained by the receiving member 108 in the first, partially expanded configuration and FIG. 18 illustrates the fourth expandable accessory 592 being removably received and removably retained by the receiving member 108 in the second, fully expanded configuration. In each of the first and second configurations, as well as the intermediate configuration (not illustrated), at least a portion of the fourth expandable accessory 592 is received and retained by the body 127 and the plurality of legs 128 of the receiving member 108. In particular, in each of the first, second, and intermediate configurations, at least a portion of the fourth expandable member 604 engages the sloped surface 172. More particularly, in each of the first, second, and intermediate configurations, at least a portion of the fourth expandable member 604 engages the sloped surface 172 by virtue of the concave portion 176 and the convex portion 180 forming the sloped surface 172.

FIGS. 19-22, which illustrate a second example mount 700, constructed in accordance with the teachings of the present disclosure. The mount 700 of FIGS. 19-22 is structurally similar and functionally identical to the mount 100 of FIGS. 1-5. Thus, for ease of reference, and to the extent possible, the same or similar components of the mount 700 will retain the same reference numbers as outlined above with respect to mount 100, although the reference numbers will be increased by 600.

Similar to the mount 100 of FIGS. 1-5, the example mount 700 of FIGS. 19-22, includes an attachment mechanism 704, a receiving member 708, and a connecting member 712 having a first end 712a coupled to the attachment mechanism 704 and a second end 712b coupled to the receiving member 708. The receiving member 708 includes a body 727 having a first leg 728a of the plurality of legs 728 extending from the first end 735 of the body 727, and a second leg 728b of the plurality of legs 728 extending from the second end 737 of the body 727. The receiving member 708 of FIGS. 19-22 is functionally identical to the receiving member 108 of FIGS. 1-5 in that the receiving member 708 is configured to removably receive and removably retain a plurality of different expandable accessories attached to a portable electronic device. However, the receiving member 708 of FIGS. 19-22 differs from the receiving member 108 of FIGS. 1-5 in that the body 727 and the first and second legs 728a, 728b of the receiving member 708 have a different configuration than the body 127 and the first and second legs 128a, 128b of the receiving member 108 of FIGS. 1-5. In particular, while the sloped surface 772 of the receiving member 708 is, like the sloped surface 172, disposed on the body 727 and extends from the first leg 728a and the second leg 728b, the sloped surface 772 of FIGS. 19-22 does not include at least one concave portion and at least one convex portion. Rather, the sloped surface 772 includes a uniform slope from the first tip 740 to the second tip 756. Additionally, the connecting member 712 of the mount 700 includes a single bridge 786 rather than first and second bridges 184, 188, as is the case with the connecting member 112 of FIGS. 1-5. In this example, the single bridge 786 of the mount 700 couples the attachment mechanism 704 and the receiving member 708 by extending from a rear end of the attachment mechanism 704 toward the body 727 of the receiving member 708.

FIGS. 23-27 illustrate a third example mount 800, constructed in accordance with the teachings of the present disclosure. The mount 800 of FIGS. 23-27 is structurally similar and functionally identical to the mount 100 of FIGS. 1-5. Thus, for ease of reference, and to the extent possible, the same or similar components of the mount 800 will retain the same reference numbers as outlined above with respect to mount 100, although the reference numbers will be increased by 700.

Figure 24:
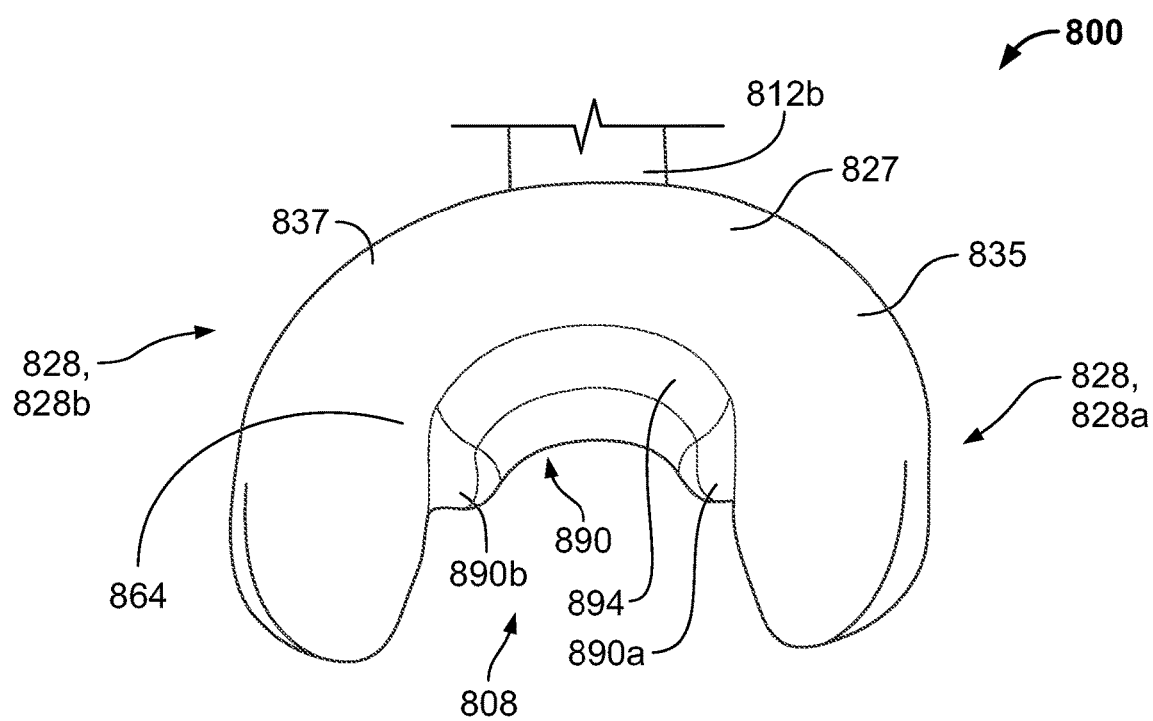
FIG. 24 is similar to FIG. 23, but with an attachment mechanism of the mount removed for clarity.
Figure 25:
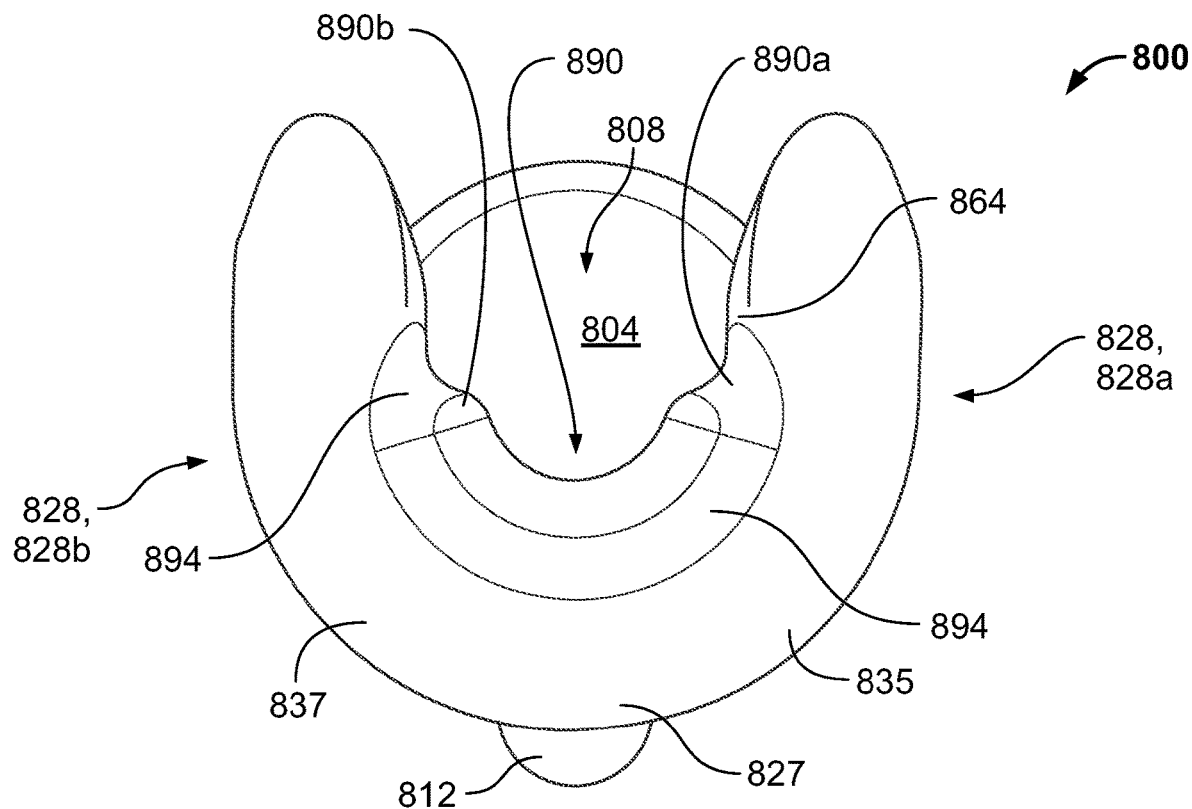
FIG. 25 is a bottom view of the mount of FIG. 23.
Figure 26:
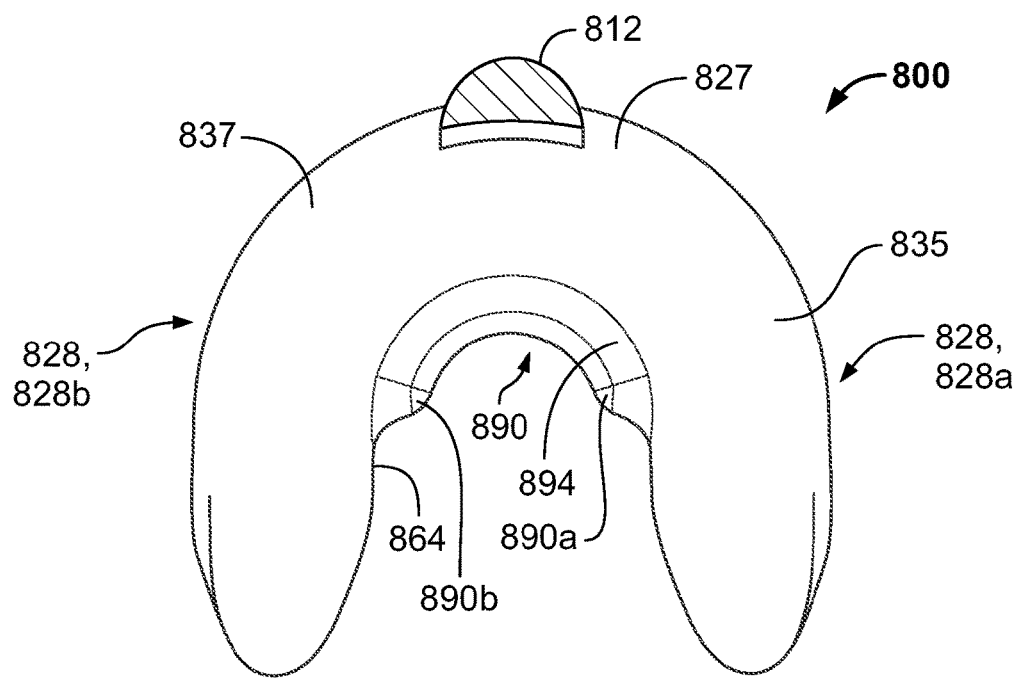
FIG. 26 is a top view of the mount of FIG. 24.
Figure 27:
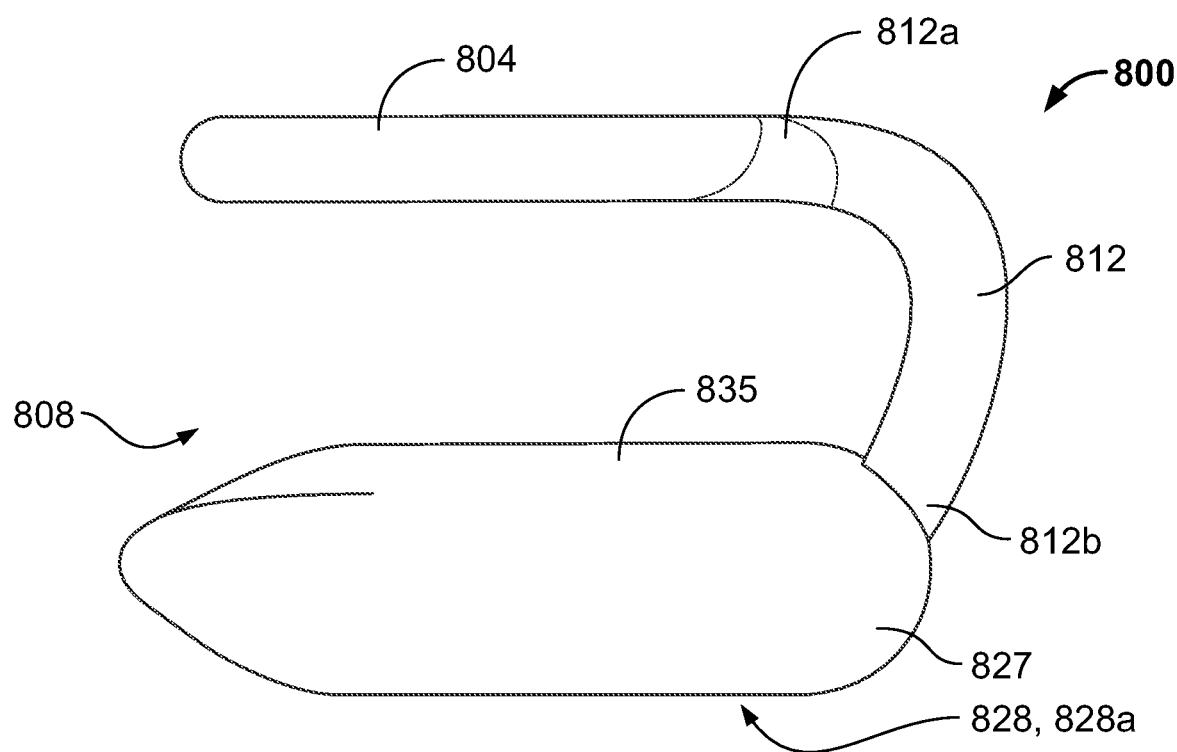
FIG. 27 is a side view of the mount of FIG. 23.
Figure 28:
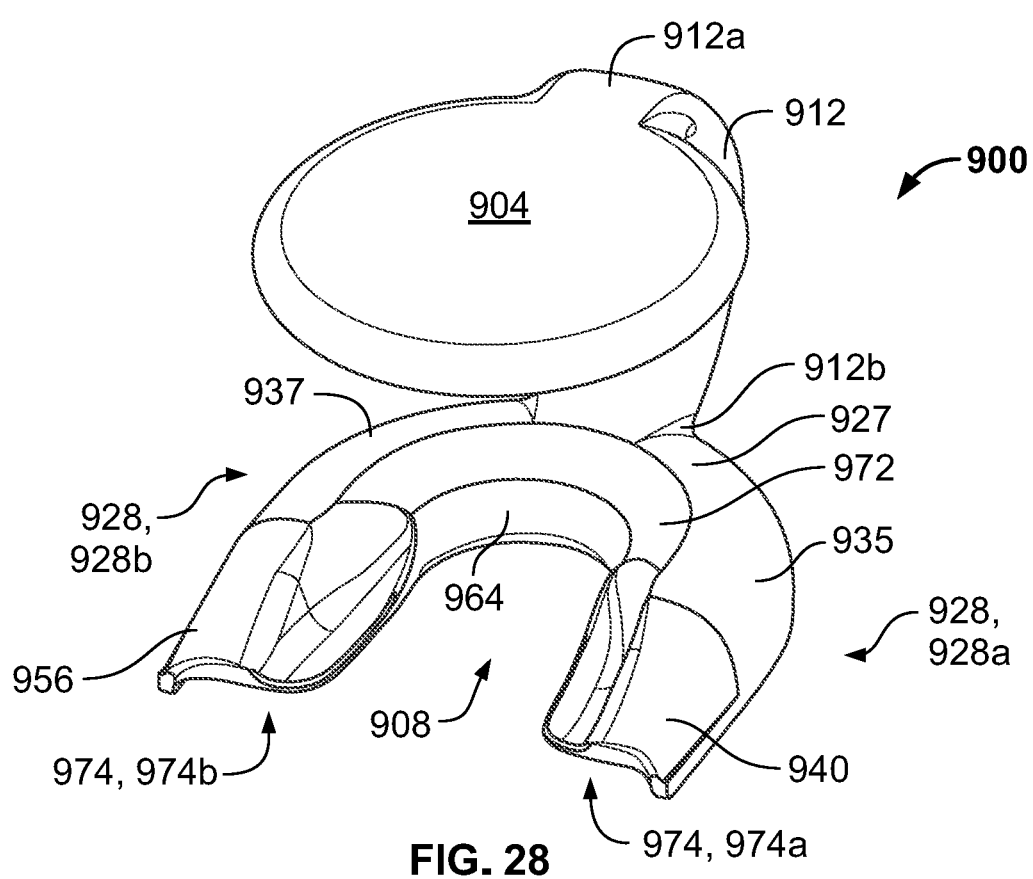
FIG. 28 is a perspective view of a fourth example of a mount, constructed in accordance with the teachings of the present disclosure.
Figure 29:
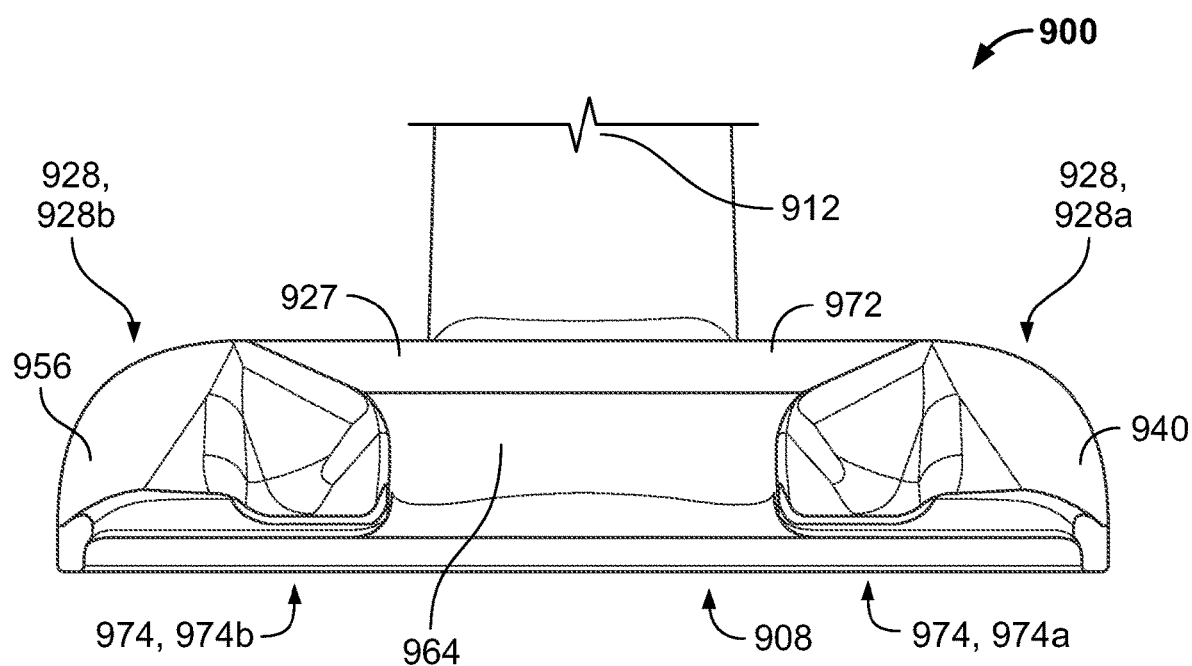
FIG. 29 is a front view of the mount of FIG. 28.
Figure 30:
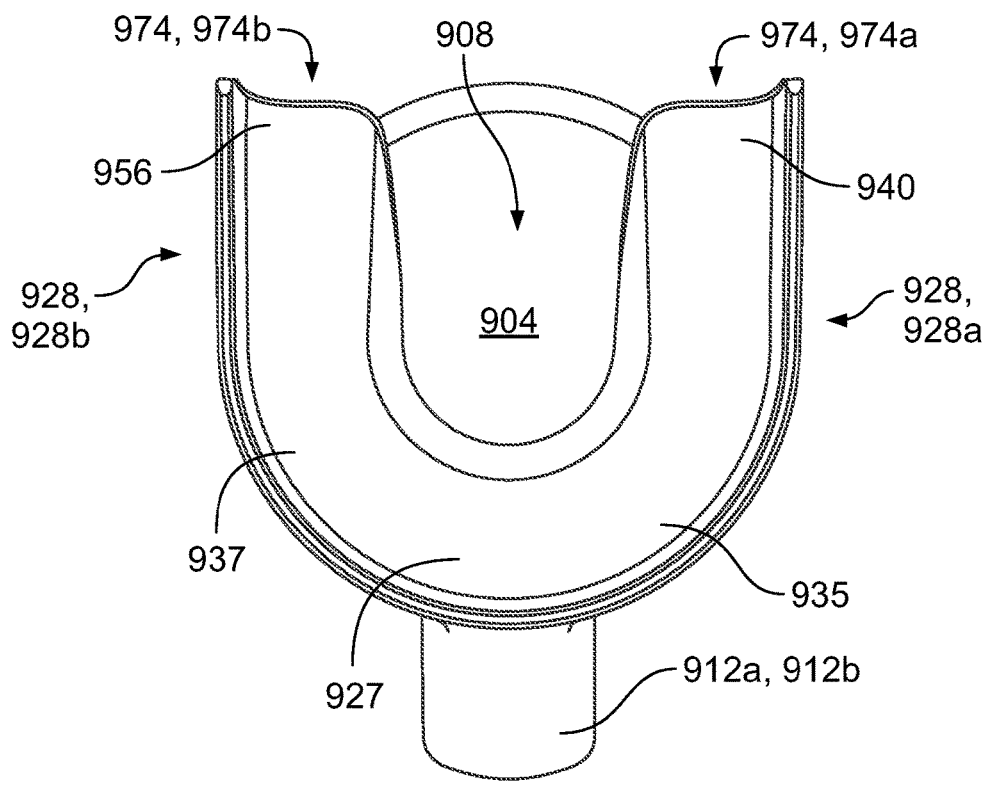
FIG. 30 is a bottom view of the mount of FIG. 28.
Figure 31:
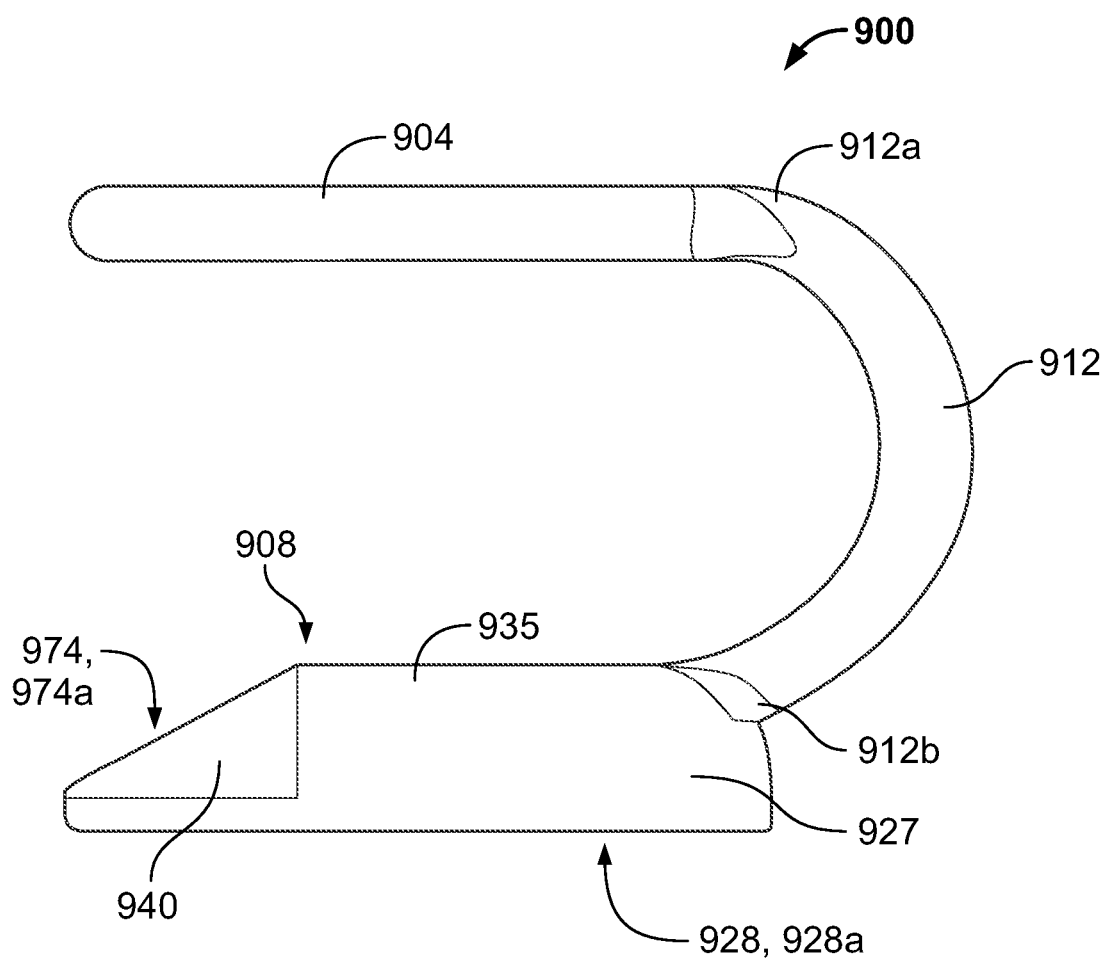
FIG. 31 is a side view of the mount of FIG. 28.

Similar to the mount 100 of FIGS. 1-5, the mount 800 of FIGS. 23-27, includes an attachment mechanism 804, a receiving member 808, and a connecting member 812 having a first end 812a coupled to the attachment mechanism 804 and a second end 812b coupled to the receiving member 808. The receiving member 808 includes a body 827 having a first leg 828a of the plurality of legs 828 extending from the first end 835 of the body 827, and a second leg 828b of the plurality of legs 828 extending from the second end 837 of the body 827. The receiving member 808 is functionally identical to the receiving member 108 (FIGS. 1-5) in that the receiving member 808 is configured to removably receive and removably retain a plurality of different expandable accessories attached to a portable electronic device. However, the receiving member 808 differs from the receiving member 108 (FIGS. 1-5) in that the first and second legs 828*a*, 828*b* of the receiving member 808 have a different configuration than the first and second legs 128*a*, 128*b* of the receiving member 108 (FIGS. 1-5). In particular, unlike the receiving members 108, 708 of the first and second mounts 100, 700, the receiving member 808 of the third mount 800 includes a protrusion 890 that is disposed on an inner surface of the receiving member 808 and is configured to engage the plurality of different expandable accessories. In this example, the protrusion 890 is disposed on an inner surface of the body 827 and a portion of each of the first and second legs 828*a*, 828*b*. More particularly, as best illustrated in FIGS. 24-26, the protrusion 890 includes a first end 890*a* that extends from the inner surface 864 of the first leg 828*a* and a second end 890*b* that extends from the inner surface 864 of the second leg 828*b*. Further, a concave surface 894 extends radially inwardly from the body 828 and between the first end 890*a* of the protrusion 890 and the second end 890*b* of the protrusion 890. The concave surface 894, similar to the sloped surface 172 of the mount 100 and the sloped surface 772 of the mount 700, is adapted to engage at least a part of the expandable member 808 of the expandable accessory 800.

FIGS. 28-31 illustrate a fourth example mount 900, constructed in accordance with the teachings of the present disclosure. The mount 900 is structurally similar and functionally identical to the mount 100. Thus, for ease of reference, and to the extent possible, the same or similar components of the mount 900 will retain the same reference numbers as outlined above with respect to mount 100, although the reference numbers will be increased by 800.

Similar to the mount 100 (FIGS. 1-5), the mount 900 includes an attachment mechanism 904, a receiving member 908, and a connecting member 912 having a first end 912*a* coupled to the attachment mechanism 904 and a second end 912*b* coupled to the receiving member 908. The receiving member 908 includes a body 927 having a first leg 928*a* of the plurality of legs 928 extending from the first end 935 of the body 927 and a second leg 928*b* of the plurality of legs 928 extending from the second end 937 of the body 927. The receiving member 908 is functionally identical to the receiving member 108 in that the receiving member 908 is configured to removably receive a plurality of different expandable accessories attached to a portable electronic device. However, the receiving member 908 differs from the receiving member 108 in that the first and second legs 928*a*, 928*b* of the receiving member 908 have a different configuration than the first and second legs 128*a*, 128*b* of the receiving member 108. In particular, while the receiving member 908 includes a sloped surface 972, the receiving member 908 further includes a plurality of concave surfaces 974 that, in conjunction with the sloped surface 972, are configured to removably receive and removably retain the plurality of different expandable accessories discussed extensively above. The plurality of concave surfaces 974 are generally arranged on an inner surface 964 of the receiving member 908. More particularly, as the first tip 940 of the first leg 928*a* includes a first concave surface 974*a* of the plurality of concave surfaces 974, and the second tip 956 of the second leg 928*b* includes a second concave surface 974*b* of the plurality of concave surfaces 974.

As with the exemplary attachment mechanism 104 described above, it should similarly be appreciated that attachment mechanisms 704, 804 and 904 are depicted as being disc-like as an example only, but they may comprise any number of different shapes or forms and need not be round or planar.

It will be appreciated that the mounts disclosed herein are also configured to removably receive and retain other expandable accessories beyond the expandable accessories 192, 392, 492, and 592. As an example, the mounts disclosed herein are configured to removably receive and retain the expandable accessories disclosed in U.S. Pat. No. 8,560,031, filed on Feb. 23, 2012, and U.S. Pat. No. 9,958,107, filed on Nov. 3, 2017, the contents of both of which are hereby incorporated by reference in their entirety.

Those skilled in the art will recognize that a wide variety of modifications, alterations, and combinations can be made with respect to the above described examples without departing from the scope of the disclosure, and that such modifications, alterations, and combinations are to be viewed as being within the ambit of the inventive concept.

We claim:

1. A mount configured to removably receive a plurality of different expandable accessories attached to a portable electronic device, the mount comprising:
    an attachment mechanism;
    a receiving member; and
    a connecting member having a first end coupled to the attachment mechanism and a second end coupled to the receiving member,
    wherein the receiving member further comprises a body, a first leg of a plurality of legs and a second leg of the plurality of legs, wherein each of the body, first leg and second leg has an inner surface,
    wherein the first leg and second leg are adapted to removably receive therebetween a first expandable accessory of the plurality of different expandable accessories, and wherein the first leg and second leg are further adapted to interchangeably and removably receive therebetween a second expandable accessory of the plurality of different expandable accessories, wherein the second expandable accessory having or being in a different configuration from the first expandable accessory, and
    wherein the inner surfaces of the body, the first leg and the second leg together form a substantially U-shaped profile such that the first leg extends outwardly from a first end of the body along a first axis, and the second leg extends outwardly from a second end of the body along a second axis offset from and substantially parallel to the first axis.

2. The mount of claim 1, further comprising a sloped surface disposed on an inner surface of the receiving member.

3. The mount of claim 2, wherein the sloped surface is disposed between the plurality of legs.

4. The mount of claim 2, wherein the sloped surface includes at least one concave portion and at least one convex portion.

5. The mount of claim 1, further comprising a protrusion extending from an inner surface of the receiving member.

6. The mount of claim 5, wherein the protrusion further includes a concave surface extending between the first and second ends of the protrusion.

7. A mounting system for a plurality of different expandable accessories attached to a portable electronic device, the system comprising:
    a first expandable accessory;

a second expandable accessory having or being in a different configuration from the first expandable accessory; and
a mount comprising:
an attachment mechanism;
a receiving member; and
a connecting member having a first end coupled to the attachment mechanism and a second end coupled to the receiving member,
wherein the receiving member further comprises a body, a first leg of a plurality of legs and a second leg of the plurality of legs, wherein each of the body, first leg and second leg has an inner surface,
wherein the first leg and second leg are adapted to removably receive therebetween the first expandable accessory, and wherein the first leg and second leg are further adapted to interchangeably and removably receive therebetween the second expandable accessory, and
wherein the inner surfaces of the body, the first leg and the second leg together form a substantially U-shaped profile such that the first leg extends outwardly from a first end of the body along a first axis, and the second leg extends outwardly from a second end of the body along a second axis offset from and substantially parallel to the first axis.

8. The mounting system of claim 7, wherein the second expandable accessory has one or more of a different shape, a different size, and different functionality than the first expandable accessory.

9. The mounting system of claim 7, further comprising a sloped surface disposed on the body between the first leg and the second leg of the plurality of legs.

10. A mounting system for a plurality of different expandable accessories attached to a portable electronic device, the system comprising:
a first expandable accessory adapted to be attached to the portable electronic device and having:
a first platform securable to the portable electronic device;
a first expandable member operably coupled to the first platform; and
a first button operably coupled to the first expandable member opposite the first platform,
wherein the first expandable member is positionable between a first, collapsed configuration and a second, expanded configuration;
a second expandable accessory adapted to be attached to the portable electronic device, the second expandable accessory having or being in a different configuration from the first expandable accessory and having:
a second platform securable to the portable electronic device;
a second expandable member operably coupled to the second platform; and
a second button operably coupled to the second expandable member opposite the second platform,
wherein, the second expandable member is positionable between a first, collapsed configuration and a second, expanded configuration; and
a mount comprising:
an attachment mechanism;
a receiving member; and
a connecting member having a first end coupled to the attachment mechanism and a second end coupled to the receiving member,
wherein the receiving member further comprises a body, a first leg of a plurality of legs and a second leg of the plurality of legs, wherein each of the body, first leg and second leg as an inner surface,
wherein the first leg and second leg are adapted to removably receive therebetween the first expandable accessory, and wherein the first leg and second leg are further adapted to interchangeably and removably receive therebetween the second expandable accessory, and
wherein the inner surfaces of the body, the first leg and the second leg together form a substantially U-shaped profile such that the first leg extends outwardly from a first end of the body along a first axis, and the second leg extends outwardly from a second end of the body along a second axis offset from and substantially parallel to the first axis.

11. The system of claim 10, wherein the receiving member includes a sloped surface disposed on an inner surface of the body.

12. The system of claim 11, wherein the sloped surface extends between the first leg and the second leg of the plurality of legs.

13. The system of claim 10, wherein the receiving member further comprises a protrusion extending from the body.

14. The system of claim 13, wherein the protrusion further includes at least one concave portion and at least one convex portion.

* * * * *